(12) United States Patent
Schlanger

(10) Patent No.: US 10,214,258 B2
(45) Date of Patent: Feb. 26, 2019

(54) HEIGHT ADJUSTABLE SEATPOST ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 0 days.

(21) Appl. No.: 15/644,977

(22) Filed: Jul. 10, 2017

(65) Prior Publication Data

US 2018/0009494 A1    Jan. 11, 2018

Related U.S. Application Data

(60) Provisional application No. 62/360,285, filed on Jul. 8, 2016.

(51) Int. Cl.
     *B62J 1/08*      (2006.01)
     *B62K 19/36*     (2006.01)

(52) U.S. Cl.
     CPC ............... *B62J 1/08* (2013.01); *B62K 19/36* (2013.01); *B62J 2001/085* (2013.01)

(58) Field of Classification Search
     CPC ......... B62J 1/02; B62J 1/06; B62J 1/08; B62J 1/10
     See application file for complete search history.

(56) References Cited

U.S. PATENT DOCUMENTS

| | | | | |
|---|---|---|---|---|
| 453,094 A | * | 5/1891 | Taylor | B62H 7/00 280/304 |
| 2,623,573 A | * | 12/1952 | Di Gaetano | B62J 1/06 280/283 |
| 5,011,174 A | * | 4/1991 | Ross-Clunis | B62K 19/36 248/161 |
| 5,094,424 A | * | 3/1992 | Hartway | B62K 19/36 248/600 |
| 5,335,754 A | * | 8/1994 | Gibson | E06C 7/44 182/204 |
| 5,344,170 A | * | 9/1994 | Ochoa | B62J 1/02 280/275 |
| 5,583,288 A | * | 12/1996 | Brenner | B60C 23/00 248/354.5 |
| 6,138,973 A | * | 10/2000 | Woodward | A47C 3/26 248/188.5 |
| 6,595,226 B2 | * | 7/2003 | Uemura | A45B 9/00 135/69 |

(Continued)

*Primary Examiner* — Daniel J Wiley

(57) ABSTRACT

A seatpost assembly, including a first seatpost portion, a second seatpost portion axially displaceable relative to the first seatpost portion along an axial axis, and an engagement element with a circumferential coil portion having a first termination and a second termination. The engagement element may be elastically deflected in a relaxing direction toward an engaged orientation to provide restraint of the axial displacement at a restraining interface with one of the first and second seatpost portions; and in a deflecting direction toward a released orientation for reduced restraint. The engagement element has an axially maintained engagement with the other one of the first seatpost portion. Where one of: (i) the released orientation corresponds to a radially outwardly expanded orientation of the engagement element relative to the deflected position; and (ii) the released orientation corresponds to a radially inwardly contracted orientation of the engagement element relative to the deflected position.

40 Claims, 22 Drawing Sheets

(56) References Cited

U.S. PATENT DOCUMENTS

| | | | |
|---|---|---|---|
| 8,007,196 B2* | 8/2011 | Whitling | F16B 7/042 |
| | | | 403/109.1 |
| 9,239,126 B2* | 1/2016 | Adamson | F16M 11/046 |
| 2015/0210341 A1* | 7/2015 | Chen | B62J 1/08 |
| | | | 297/215.13 |

* cited by examiner

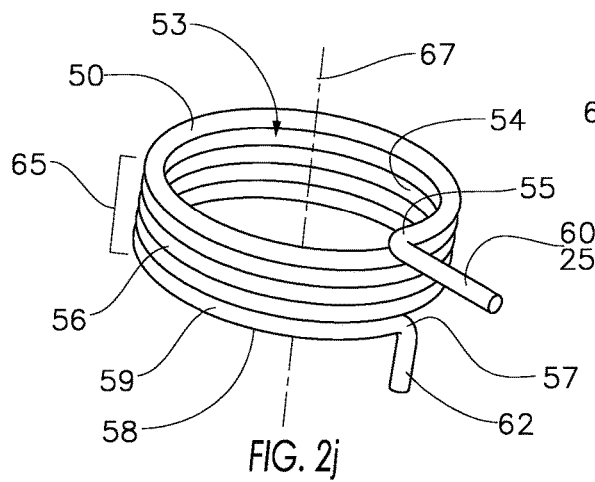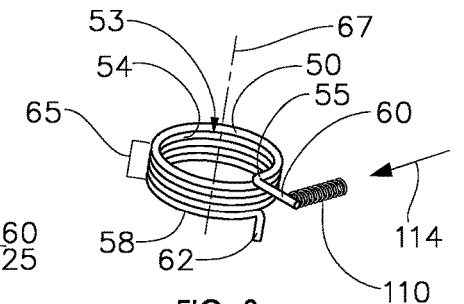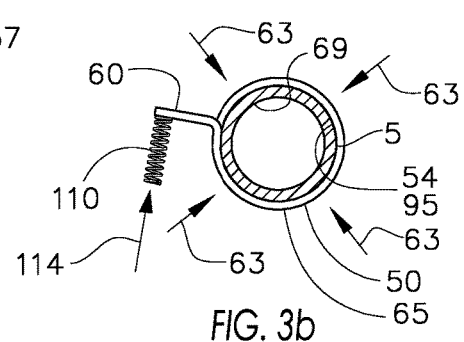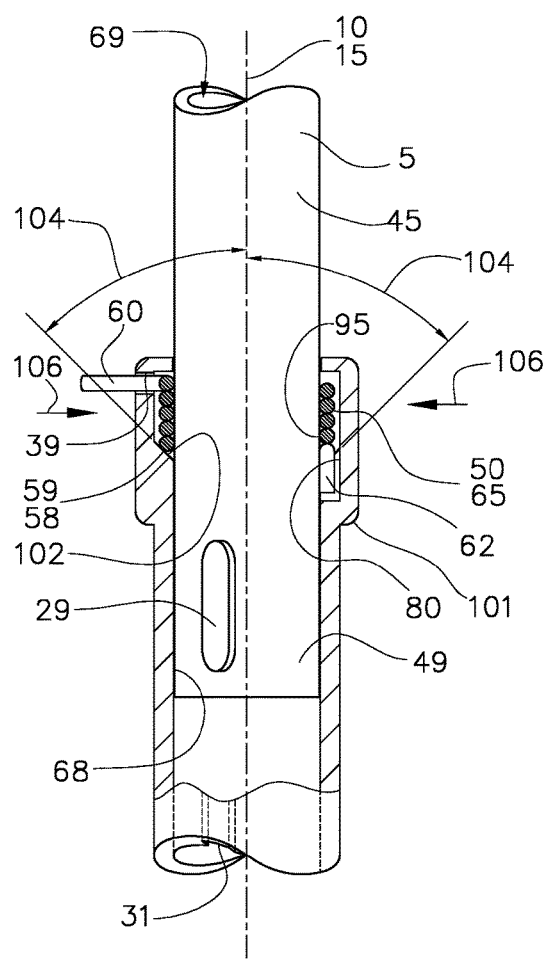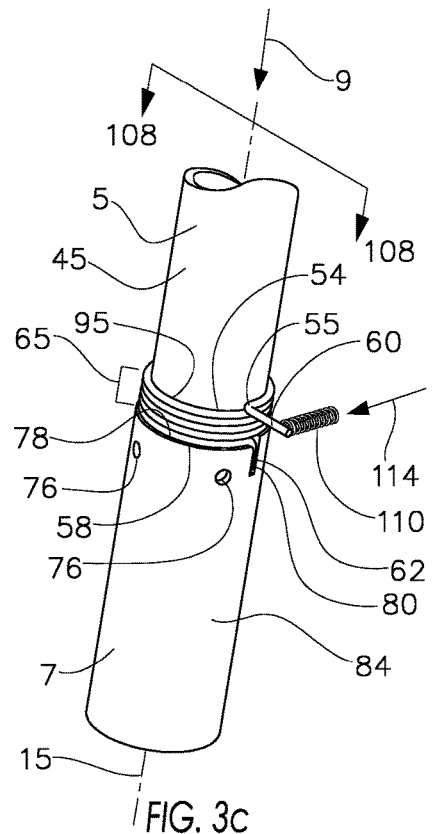

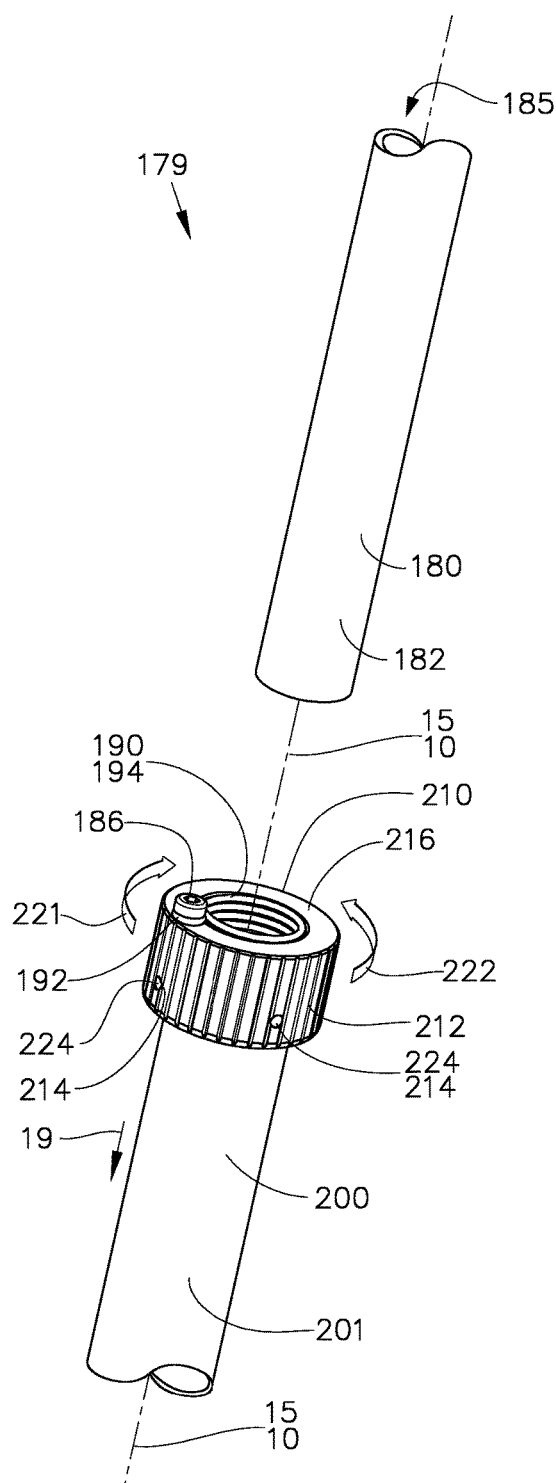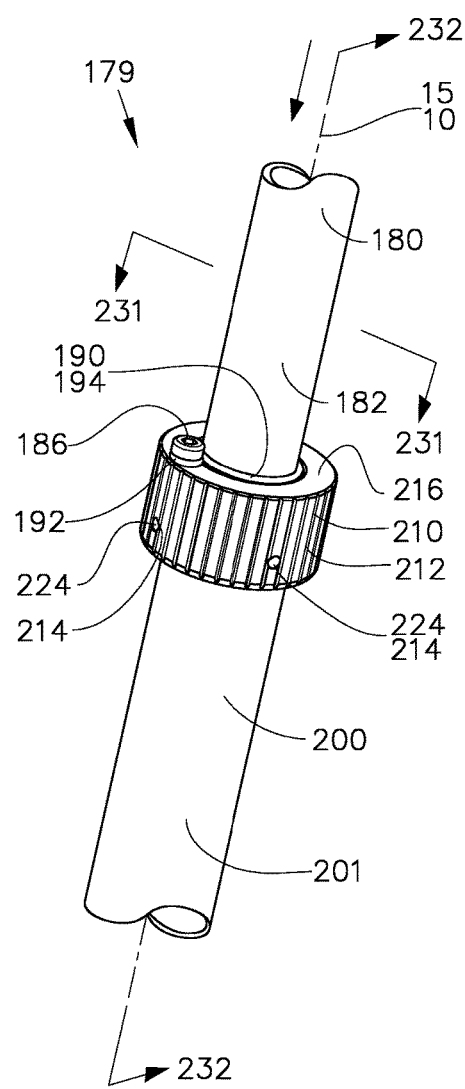
FIG. 6c
FIG. 6d

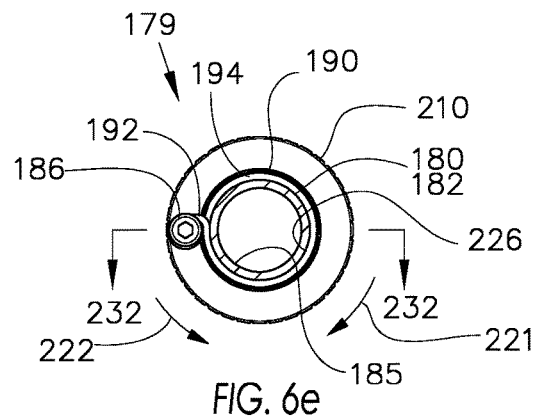
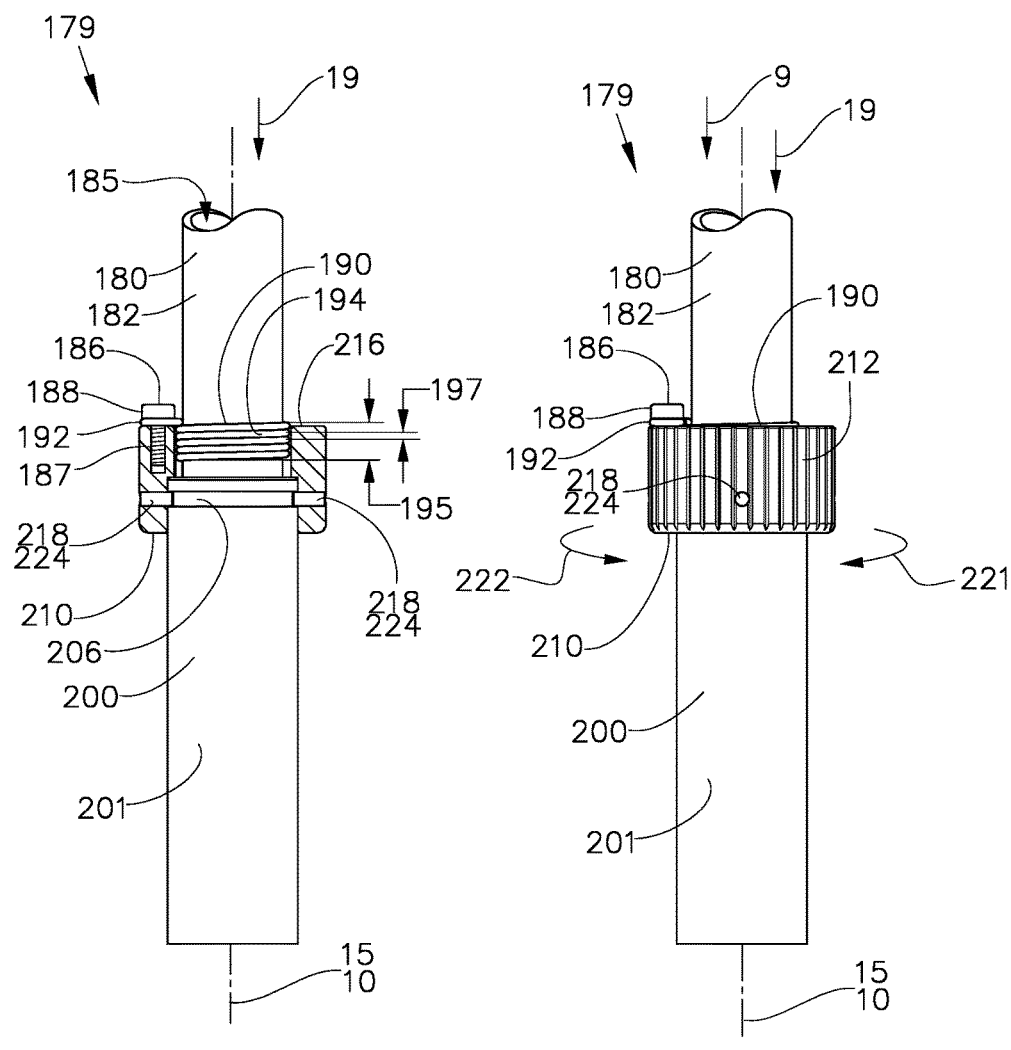
FIG. 6e
FIG. 6f
FIG. 6g

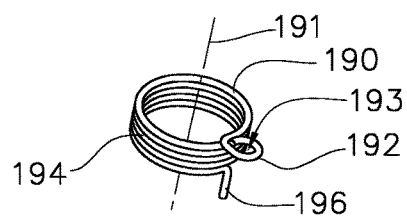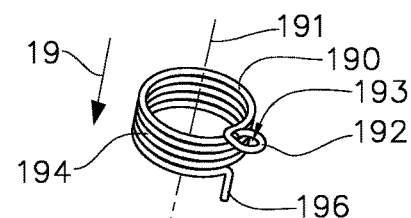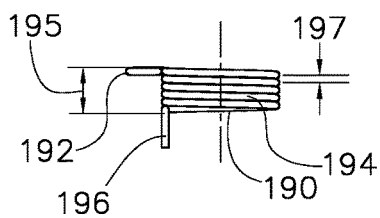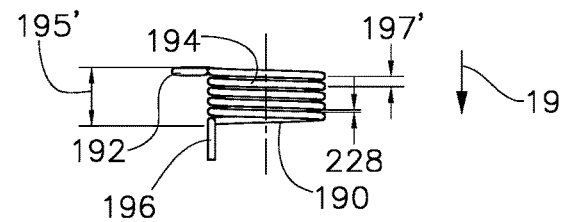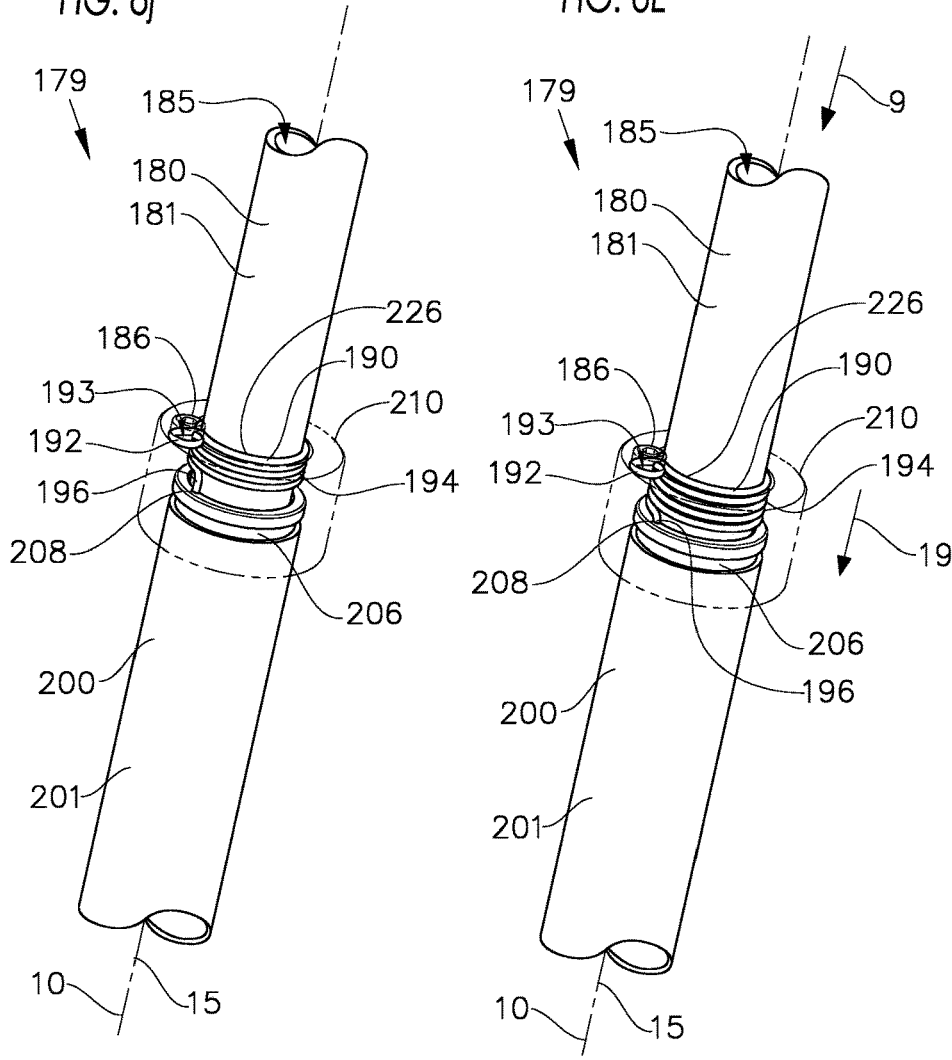

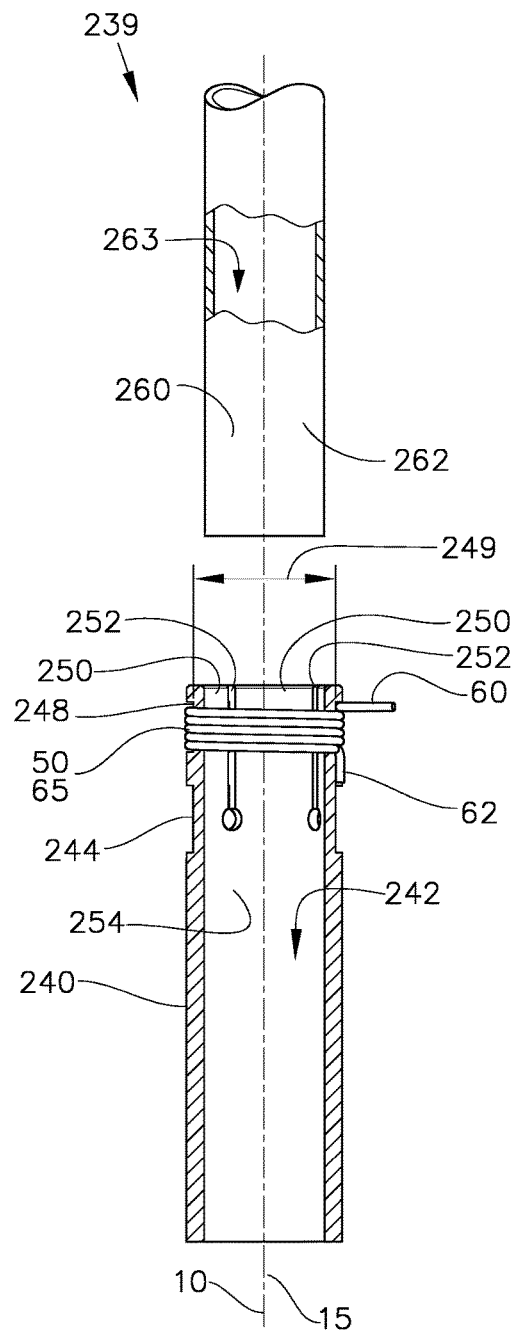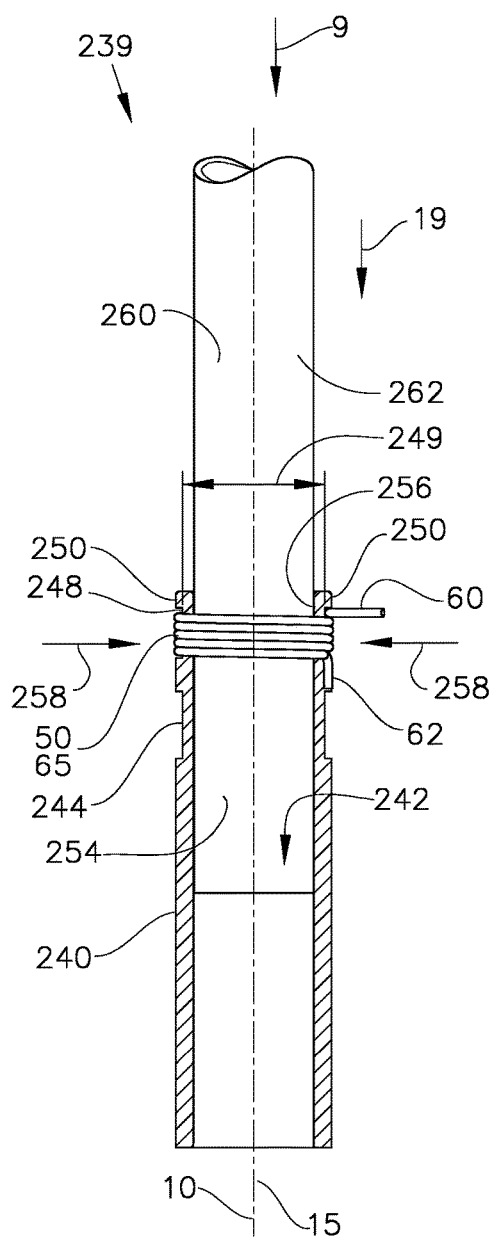
FIG. 7d                    FIG. 7e

HEIGHT ADJUSTABLE SEATPOST ASSEMBLY

CROSS-REFERENCE TO RELATED APPLICATION

This application claims priority of U.S. Provisional Patent application Ser. No. 62/360,285, filed Jul. 8, 2016.

BACKGROUND OF THE INVENTION (1) Field of the Invention

The present invention relates to an improved seatpost for supporting a seating surface, particularly applicable to supporting the seat of a human powered vehicle, such as a bicycle.

(2) Description of the Related Art

Heretofore, the vast majority of bicycle seatposts have been of a rigid fixed-height configuration, where the seatpost is clamped to the frame and the height of the seat is not quickly and easily adjusted. However, more recently, height adjustable seatposts have been introduced to the market. These height-adjustable seatposts are particularly popular in mountain bike applications where the seat must be quickly lowered or retracted to allow the rider additional clearance for riding over obstacles or steep terrain.

These height-adjustable seatposts commonly employ two telescoping seatpost elements and a locking/releasing mechanism for selectively releasing the seatpost to be telescopically adjusted to the desired height and then locking the two telescoping elements to each other with a locking mechanism. The majority of existing bicycle height-adjustable seatposts employ hydraulics and/or pneumatic valves to provide this locking, which requires expensive sealing and closely controlled dimensional tolerances. As such, these existing seatposts are very expensive and many have had inadequate reliability.

It is an objective of the present invention to provide a height-adjustable seatpost that is light in weight, inexpensive to produce, and has very good reliability.

Further objects and advantages of the present invention will appear hereinbelow.

SUMMARY OF THE INVENTION

In accordance with the present invention, it has now been found that the forgoing objects and advantages may be readily obtained.

The present invention comprises a seatpost assembly having a first portion to which a seat may be mounted and a second portion that is fixed to the frame. The first and second portions may be arranged to be telescopically displaced relative to each other to adjust the height of the seat relative to the frame between an extended and raised position of the seat and a retracted and lowered position. The present invention includes an elastic engagement element that is positioned to extend circumferentially around the first or the second portion. This engagement element may be elastically flexed between a released and unlocked first position that permits telescopic displacement of the first portion relative to the second portion and a locked or engaged second position that restricts the telescopic displacement of the first portion relative to the second portion. The engagement element is an elastic element that may be radially flexed between a radially expanded position and a radially contracted position. This radially expanded position may correspond to the released first position, with the radially contracted position corresponding to the engaged second position or vice versa.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2j is a perspective view the spring of the embodiment of FIG. 2a;

FIG. 2k is a cross-section view of an alternate embodiment similar to the embodiment of FIGS. 2g-i, taken along 88-88 and corresponding to FIG. 2g, and illustrating an abutment surface that is inclined for radially inward wedging of the lower coil of the spring;

FIG. 3a is a perspective view showing an alternate embodiment to the embodiment of FIGS. 2a-j that is identical to the embodiment of FIG. 2a with the exception of the inclusion of an additional biasing element that is shown here as a compression spring that serves to provide additional circumferential wrapping force to the radial tang;

FIG. 3b is a cross-section view, taken along 108-108 showing the arrangement of FIG. 3a, and including the internal member;

FIG. 3c is a perspective view showing the arrangement of FIG. 3a, and including the internal member and external member;

FIG. 6c is an exploded perspective view of the embodiment of FIG. 6a, with the pre-assembly of FIG. 6b as next pre-assembled and to the external member;

FIG. 6d is a perspective view of the embodiment of FIG. 6a, with the internal member as next assembled to the pre-assembly of FIG. 6c;

FIG. 6e is a partial cross-section view, taken along 231-231, of the embodiment of FIG. 6a, and corresponding to the assembly sequence of FIG. 6d;

FIG. 6f is a partial cross-section view, taken along 232-232, of the embodiment of FIG. 6a, and corresponding to the assembly sequence of FIG. 6d, showing only the collar in cross section, also showing a retaining pin to axially retain the collar to the external member;

FIG. 6g is an orthogonal view of the embodiment of FIG. 6a, corresponding to the assembly sequence of FIG. 6d;

FIG. 6i is a perspective view of the spring of FIG. 6a in an axially relaxed position, with the individual loops of the coil as solidly stacked and without gaps therebetween;

FIG. 6j is an orthogonal view of the spring of FIG. 6i;

FIG. 6k is a perspective view of the spring of FIG. 6a in an axially extended and stretched position, including gaps between the individual loops of the coil;

FIG. 6L is an orthogonal view of the spring of FIG. 6j;

FIG. 6m is a perspective view of the embodiment of FIG. 6a, corresponding to the assembly sequence of FIG. 6d, and showing the collar in phantom to better illustrate the spring and its interaction with the internal member and external member, with the spring in the axially relaxed position shown in FIG. 6i;

FIG. 6n is a perspective view of the embodiment of FIG. 6a, corresponding to the assembly sequence of FIG. 6d, and showing the collar in phantom to better illustrate the spring and its interaction with the internal member and external member, with the spring in the axially stretched and extended position shown in FIG. 6k;

FIG. 7d is a partial cross-sectional view, taken along 302-302, of the embodiment of FIGS. 7a-c and corresponding to the assembly sequence of FIG. 7b;

FIG. 7e is a partial cross-sectional view, taken along 302-302, of the embodiment of FIGS. 7a-c and corresponding to the assembly sequence of FIG. 7c;

DETAILED DESCRIPTION OF THE INVENTION

Figure 1:
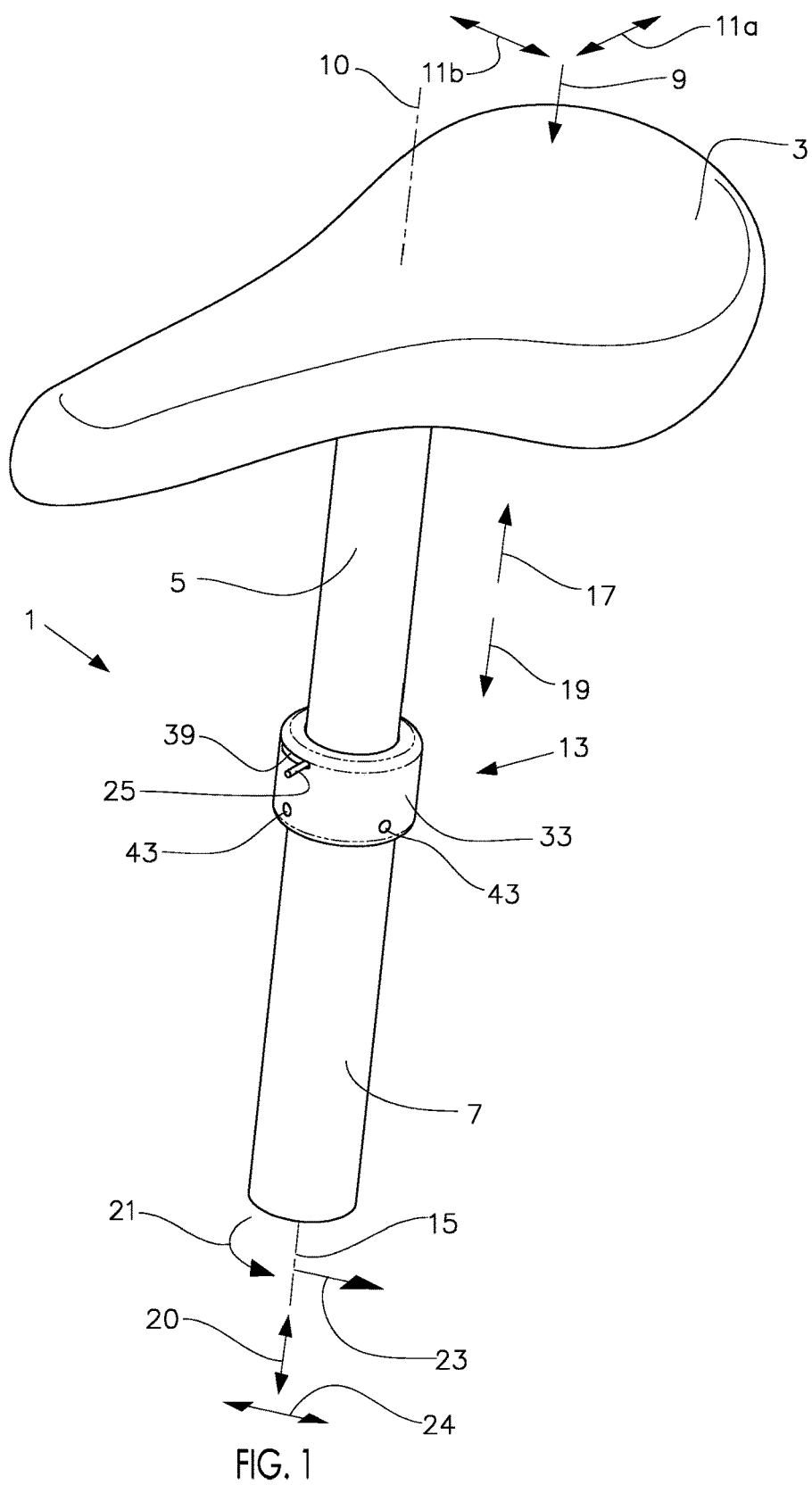
FIG. 1 is a perspective view schematically illustrating the general configuration of a first embodiment of the present invention, including description of the generic directions and orientations utilized throughout the specification.

FIG. 1 describes the basic configuration of an exemplary height adjustable seatpost, as well as a description of the direction conventions used throughout this disclosure. For clarity, the bicycle frame is not shown in this figure.

The seatpost axis 10 extends along the general centerline of the seatpost assembly 1. The Seatpost assembly 1 consists of an internal member 5 that is telescopically guided within an external member 7 along an axial axis 15. As shown in FIG. 1, the external member 7 is fixedly mounted to the frame of a bicycle (not shown). The internal member 5 is moveable and may be telescopically displaced to be generally upwardly raised and extended relative to the external member 7 in the extending direction 17 and generally downwardly lowered and retracted in the retracting direction 19. The extending direction 17 and retracting direction 19 are both generally parallel to the telescoping axis 15. The extended orientation corresponds to reduced axial overlap between the internal member 5 and external member 7 while the retracted orientation corresponds to an increase in such axial overlap. The seatpost axis 10 and the telescoping axis 15 are generally collinear and may be used interchangeably throughout this disclosure except where noted. Axial telescopic displacement of the internal member 5 along the axial axis 15 is controlled by the locking mechanism 13, where the control lever 25 may be manipulated between a locking position to restrict and/or limit telescopic displacement and a released position to permit telescopic displacement. The seat 3 serves to generally support the weight of the rider, which corresponds to an axial load 9 applied to the seat 3. While the majority of load applied to the seat 3 by the rider is axial load 9, normal use also serves to induce lateral loads 11a and 11b to the seat as well, which may impart a significant bending moment to the seatpost assembly 1.

In order to withstand these lateral loads 11a and 11b, the seatpost assembly 1 must have sufficient structural strength and stiffness to support these loads as well. This is achieved through the robust telescopic guiding and circumferential keying between the internal member 5 and external member 7. This also requires that the internal member 5 and external member 7 have adequate strength and stiffness. To save weight of the seatpost assembly 1, it is desirable that the internal member be hollow to include an opening 69. The external member 7 also includes opening 66 and is a hollow element.

It is noted that the seat 3 is directly connected to the internal member. The telescopic guiding and circumferential keying preferably exists solely and directly between the internal member 5 and external member 7. As such, there is preferably no necessity for any additional linkage or movable element that connects the internal member 5 to the frame (not shown) for this guiding or keying. This further supports the requirement that the seatpost assembly 1 be a structural assembly to support axial loads 9 as well as lateral loads 11a and 11b.

The axial direction 20 is a direction along the axial axis 15. An axially raised orientation corresponds to the raised (or higher) orientation of the seat 3 while an axially lowered orientation corresponds to the lowered orientation of the seat 3. The radial direction 23 is a direction generally perpendicular to the seatpost axis 10 and extends generally from the seatpost axis 10 radially outwardly. A radially inward orientation is proximal the seatpost axis 10 and a radially outward orientation is distal the seatpost axis 10. The circumferential direction 21 is a cylindrical vector that wraps around the seatpost axis 10 at a given radius. A downward or lower orientation is an orientation along the seatpost axis 10 that is proximal to the fixed member (shown here as the external member 7) and to the frame (not shown). Conversely, an upward or upper or raised orientation is axially opposed to the downward orientation and proximal the seat 3 (and distal to the fixed member and to the frame). A lateral direction 24 is a direction along a plane generally perpendicular to the axial axis 15, with a laterally inwardly orientation is an orientation proximal the axial axis 15 and a laterally outward orientation is an orientation distal the axial axis 15.

Figure 4:
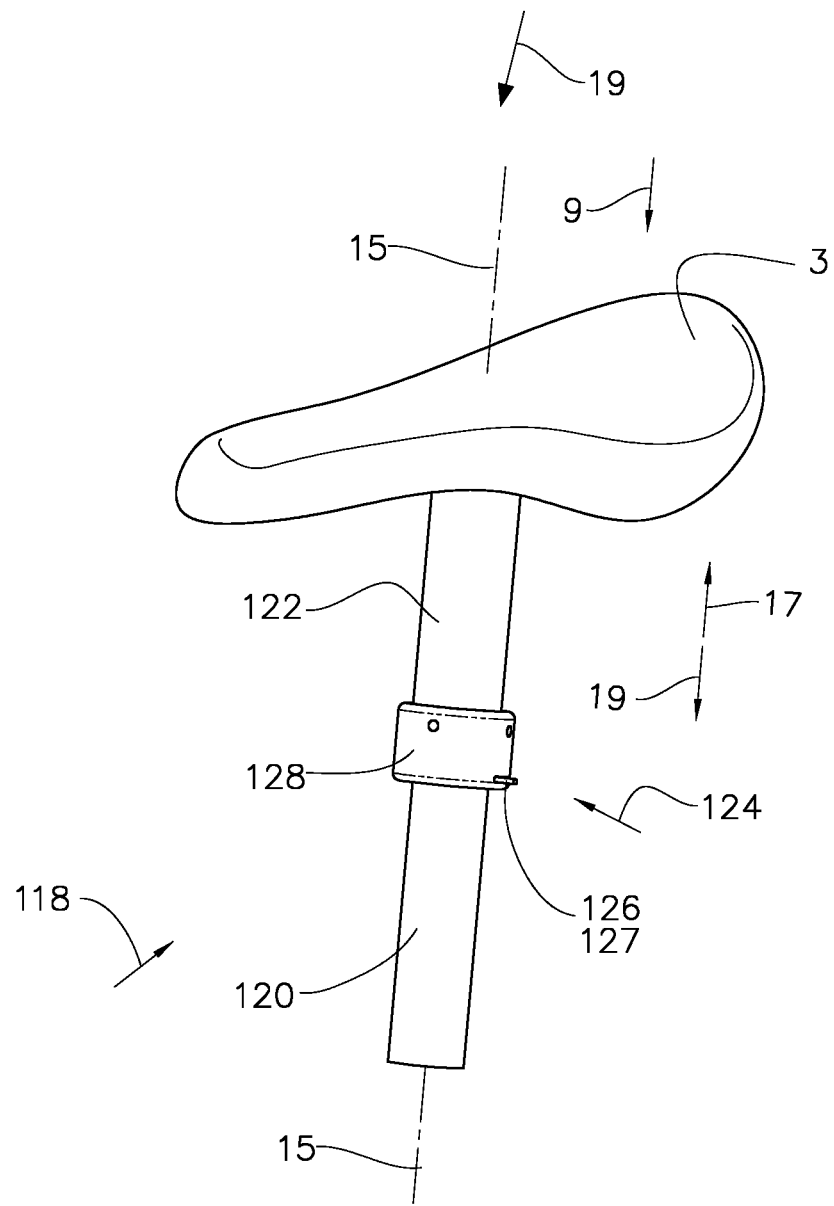
FIG. 4 is an orthogonal view of a second embodiment of the present invention, showing the seatpost assembly of FIGS. 2a-j as inverted such that the internal member is axially fixed while the external member is axially displaceable relative to the internal member and axially fixed to the seat.

The arrangement described in FIG. 1 corresponds to the arrangement described in FIGS. 2a-k, however the generic terms and schematic arrangement described in FIG. 1 may also generically correspond to any of the figures herein. It is understood that these generic terms may also be applied to a wide range of alternate configurations. For example, the seatpost assembly may alternatively be arranged in an upside-down configuration, as shown in FIG. 4, where the internal member 120 may be positioned below the external member 122 and may be fixed to the frame (not shown), with the external member 122 fixed to the seat 3 and displaceable in directions 17 and 19 relative to the internal member 120. Additionally, while the control lever 25 is shown to be connected to the fixed outer member 7, the control lever (and locking mechanism) may alternatively be connected to the displaceable internal member 5. Further, while the control lever and locking mechanism is shown to be adjacent the upward end of the fixed member, the control lever and/or locking mechanism may alternatively be positioned at some midpoint of the external member along the axial axis 15. Still further, while the internal member 5 and external member 7 are shown here to be generally linear elements that extend longitudinally along a generally straight axial axis 15, it is envisioned that the telescopic or axial axis need not necessarily be straight and longitudinal. For example, the internal and external members may alternatively be arcuate elements, with the internal member displaceable relative to the external member along an arcuate axial axis.

FIGS. 2a-j describe a first embodiment of the present invention in generic detail. The internal member 5 is a generally tubular circular cylindrical element with an external surface 45, having an outside diameter 47, extending along the axial axis 15. The internal member 5 has an upper end portion 48 connected to the seat (not shown) in the conventional manner and a lower portion 49. A longitudinal key pocket 27 is positioned adjacent the lower portion 49 to accept a key 29.

The external member 7 is also a generally tubular circular cylindrical element with an axially extending circular opening 66 therein with in internal surface 68 of inside diameter 70 to slidably receive the internal member 5. The external member also includes an external surface 72 of outside diameter 74 extending along the axial axis 15. The external member 7 has an upper end portion 82 with geometry to receive the spring 50, collar 33, and pins 43, and a lower end portion 84 with a cylindrical external surface 72 to be fixed to the seat tube (not shown) of a bicycle frame (not shown) in the conventional manner. The upper end portion 82 includes a helical abutment face 78 with a slot 80 extending axially therefrom and a series of radially extending holes 76 to receive pins 43.

The collar 33 includes opening 34 therethrough to receive the internal member 5. Opening 34 includes an internal surface 41 to receive the spring 50 and a circumferentially extending slot 39 therethrough to allow the radial tang 60 to extend therethrough. The slot is circumferentially oblong to permit the radial tang 60 to be displaced circumferentially to manually operate the locking mechanism 13. Collar 33 also includes radial holes 37 to receive mating pins 43.

The spring 50, as also detailed in FIG. 2j, is an elastic element that includes a helically wrapped spring coil 65 of wire. The wire is shown here to have a generally constant circular cross section having a wire diameter 64. The coil 65 is extended to include an axially lower termination 57 with an axially downwardly extending leg or tang 62 at its lower end and an axially upper termination 55 with a radially outwardly extending leg or tang 60. Tangs 60 and 62 are representative of a wide range of possible geometry configurations whereby the circumferential positions of terminations 55 and 57 may be controlled and/or manipulated. As a further alternative, the terminations 55 and/or 57 may simply include a cut end of the coil 65, where the cut end may provide a site to control its circumferential position.

Spring 50 is helically wrapped about the spring axis 67 to create a generally cylindrical coil 65 portion with an opening 53 having internal surface 54 of inside diameter 51 and an external surface 56 of outside diameter 52. The spring axis 67 is generally collinear with the axial axis 15. The coil 65 is shown here to be comprised of a multiplicity of stacked 360 degree coils or "turns", which are also termed herein as individual loops that extend generally helically and circumferentially, as shown. The individual loops are shown here to be circumferentially overlapping and solidly stacked along the spring axis 67 such that each individual loop is contacting the loop immediately beneath it. The spring 50 is generally conventional in configuration and construction and is commonly referred to as a "torsion spring". The spring 50 may be fabricated from a wide range of materials that have sufficient elasticity to provide the flexure described herein. A preferred candidate material may be hardened stainless steel spring wire. By virtue of the helical wrap of the spring 50, bottom surface 58 of the bottom loop 59 is also helical about spring axis 67. By convention, the spring 50 may be wound in a left-hand or right-hand direction. In this embodiment, the spring has a left-hand wind, which means that the coil 65 is wound and wrapped in a counter-clockwise direction when viewed in the axial direction. Alternatively, a right-hand wound spring may be substituted, assuming the other mating components are modified accordingly to accommodate this direction of winding.

Figure 2A:
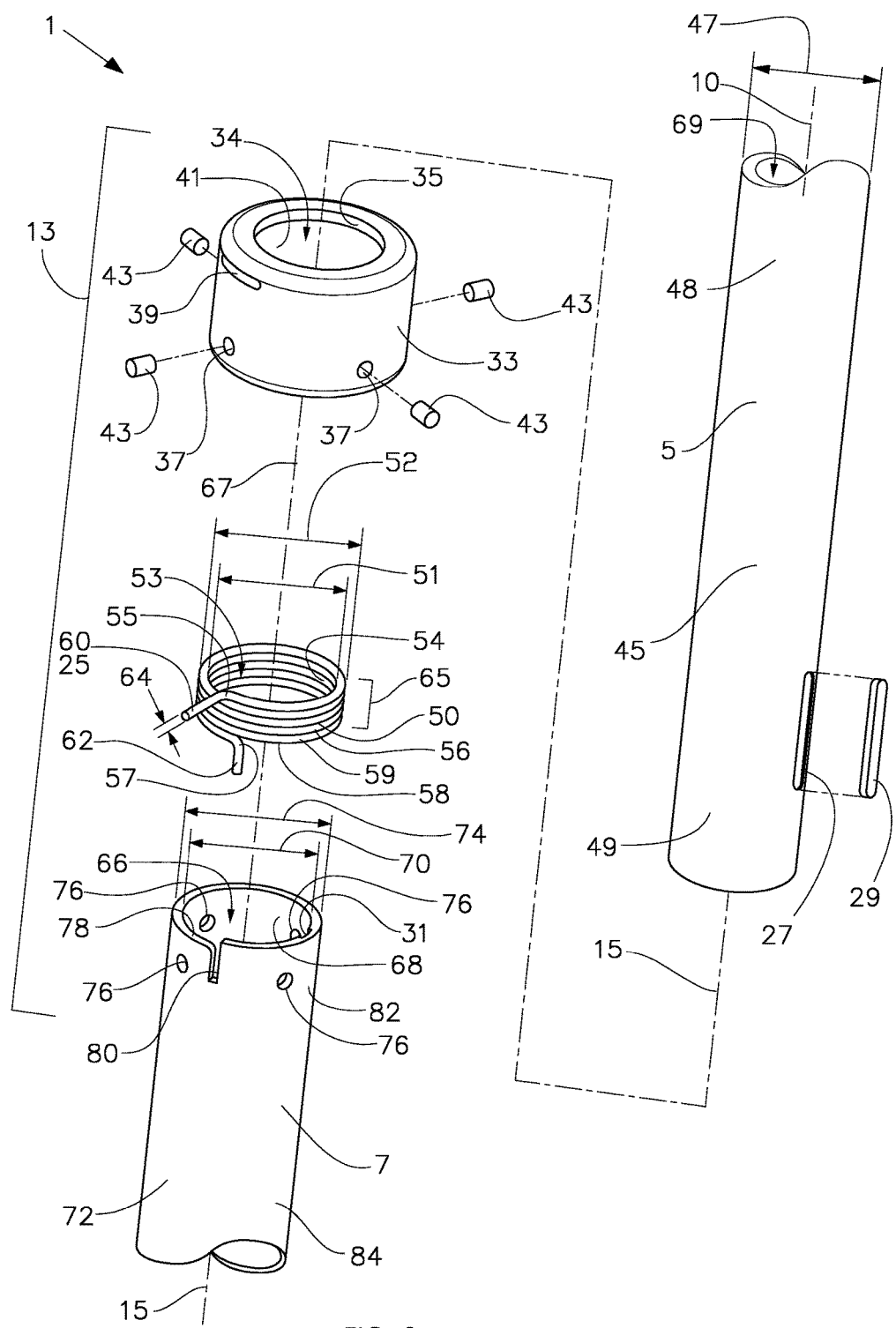
FIG. 2a is an exploded perspective view of the embodiment of FIG. 1, showing the components of the seatpost assembly.
Figure 2B:
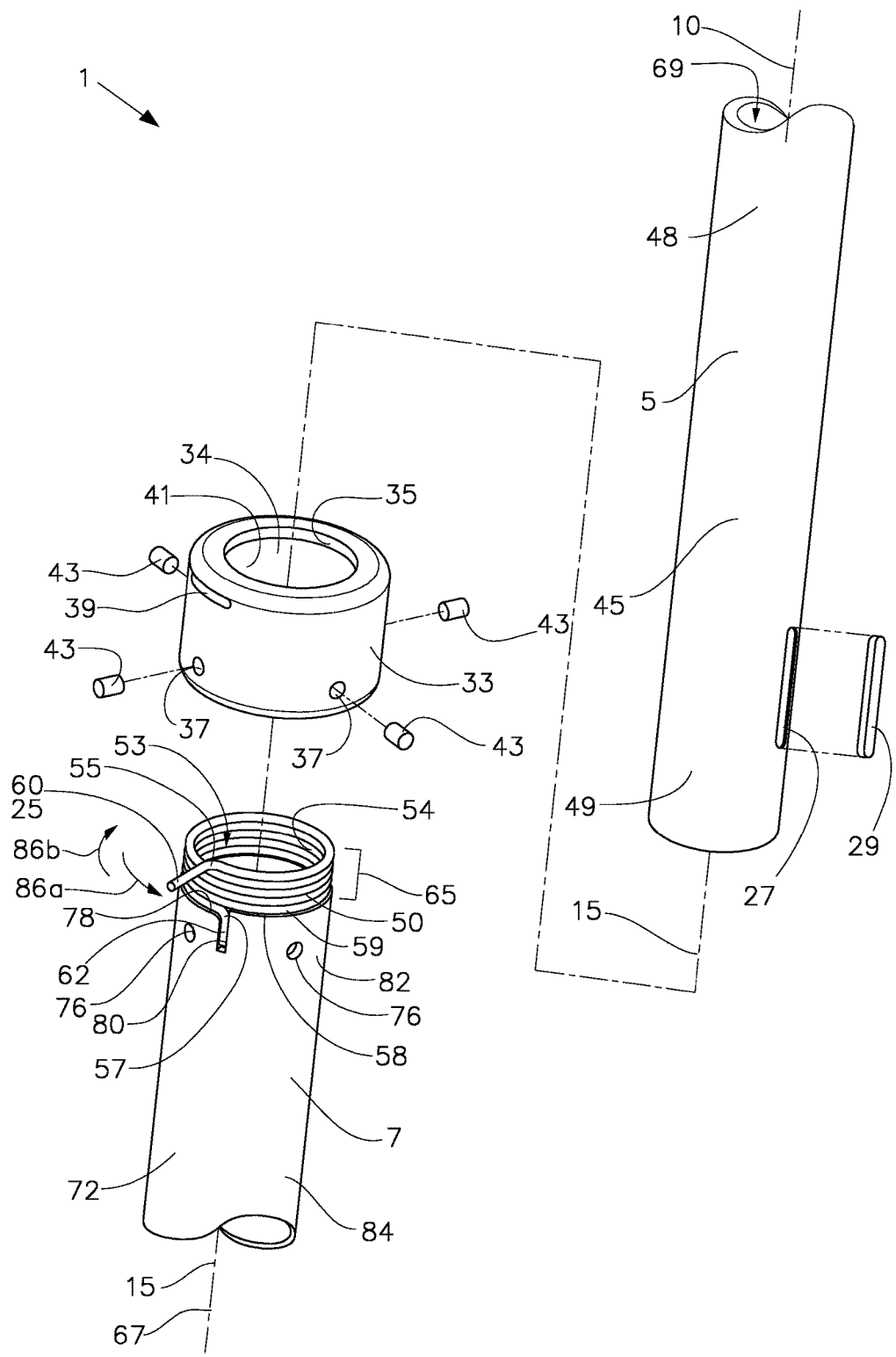
FIG. 2b is an exploded perspective view of the embodiment of FIG. 1, in a first assembly step with the spring first pre-assembled to the external member.

FIG. 2b shows the spring 50 as pre-assembled to the external member 7 for visualization purposes. The helical bottom surface 58 of the spring 50 is nested and abutting against the helical abutment face 78 of the external member 7. The axial tang 62 is also extending within the slot 80 such that this axial tang 62 is now circumferentially engaged to the outer member 7 to limit circumferential displacement therebetween. In this view it may be seen that, when the radial tang 60 is circumferentially displaced in direction 86a relative to the axial tang 62 (and the external member), the coil 65 will tend to flex and deflect to unwind and unwrap slightly, causing the inside diameter 51 and outside diameter 52 of the spring 50 to correspondingly expand and increase. This type of spring is intended to be flexed and deflected in bending, preferably without exceeding the elastic limit of the wire. Similarly, when the radial tang 60 is circumferentially displaced in direction 86b relative to the axial tang 62 (and the external member), the coil 65 will tend to wind and wrap more tightly, causing the inside diameter 51 and outside diameter 52 of the coil 65 to correspondingly contract and decrease. The spring 50 is shown here in its relaxed state with its inside diameter 51 slightly smaller than the outside diameter 47 of the internal member 5 and with its outside diameter 52 smaller than the inside diameter of the internal sidewall 41 of the collar 33.

Figure 2C:
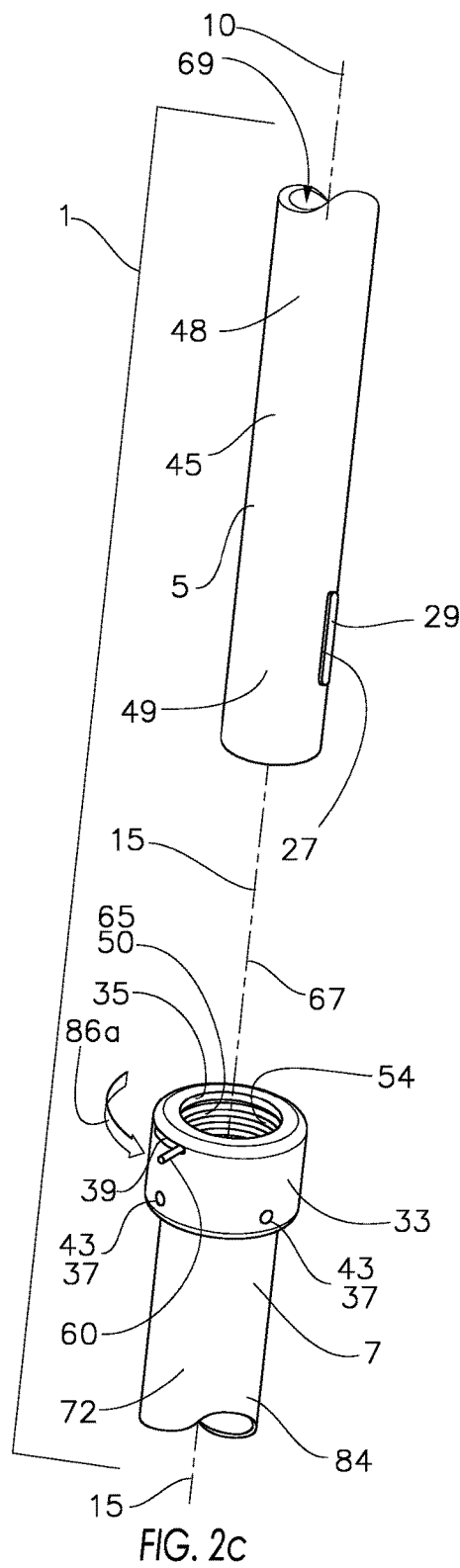
FIG. 2c is an exploded perspective view of the embodiment of FIG. 1, in a second assembly step with the collar pre-assembled to the spring and the external member.

Next, FIG. 2c shows the spring 50 as pre-assembled to the collar 33 with the radial tang 60 extending through the slot 39 and with this pre-assembly itself pre-assembled to the external member 7 as shown. The radial tang 60 is extending through slot 39. The collar 33 is secured to the external member 7 by pins 43 that are engaged to their associated holes 37 and 76. The internal member 5 is shown prior to its assembly with the pre-assembly of the spring 50, collar 33 and external member 7.

Next, the internal member 5 is assembled to the pre-assembly of the spring 50, collar 33 and external member 7. To facilitate this assembly, the key 29 has been temporarily removed from pocket 27. It is also preferable to temporarily flex the spring 50 from its relaxed state by circumferentially displacing the radial tang 60 in direction 86a relative to the axial tang 62 to unwind and unwrap the coil 65 slightly and enlarge the inside diameter 52. This now provides assembly clearance between inside diameter 51 and outside diameter 47, to allow the internal member 5 to be inserted within opening 53 in direction 9. Once the pocket 27 has advanced in direction 9 beyond the spring 50, the key 29 is re-assembled to the pocket 27 such that a portion of the key 29 is protruding radially outwardly from the external surface 45. The key 29 is then engaged to the keyway 31 of the internal surface 68 in the conventional manner.

Figure 2D:
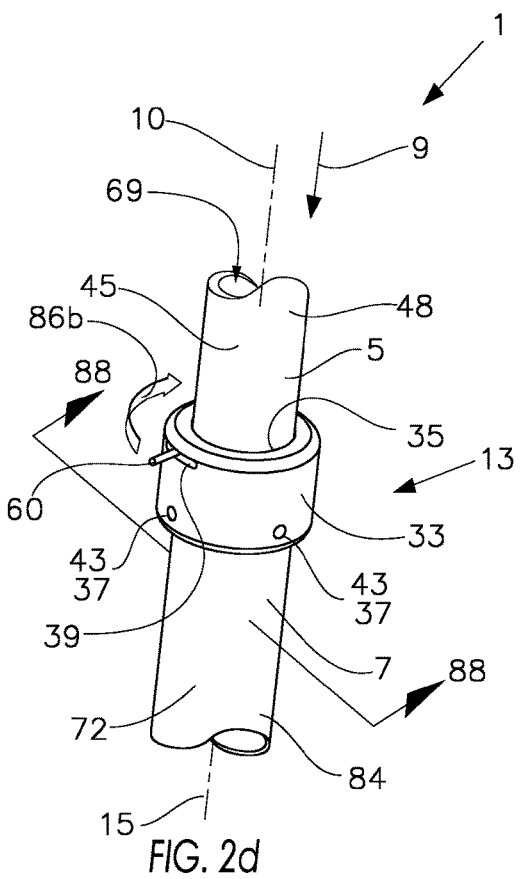
FIG. 2d is a perspective view of the embodiment of FIG. 1, in a third assembly step with the internal member and key assembled to the pre-assembly of FIG. 2c.

FIG. 2d shows the pre-assembly of the internal member 5, the spring 50, and the collar 33 as next assembled to the external member 7. The external surface 72 of the upper end portion is axially overlapping the opening 34 of the collar 33. Pins 43 are also now extending within corresponding holes 37 and 76 to axially and circumferentially lock the collar 33 to the outer member 7 and to enclose the spring 50, with the radial tang 60 extending through slot 39. The opening 66 has a close sliding fit with the external surface 45 to provide closely controlled and free telescopic displacement (i.e. extension and retraction) of the internal member 5 relative to the external member 7 along the axial axis 15.

Figure 2E:
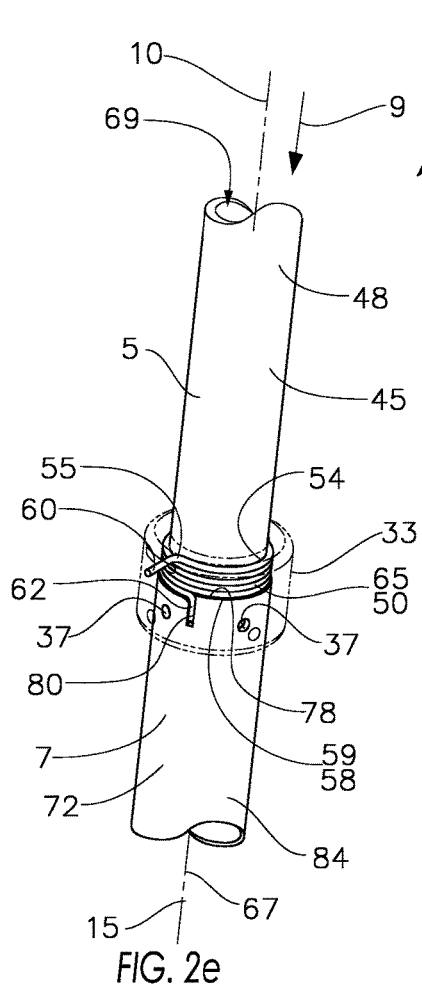
FIG. 2e is a perspective view of the embodiment of FIG. 2a, corresponding to FIG. 2d, and showing the collar in phantom to better illustrate the spring and its interaction with the internal member and external member.
Figure 2F:
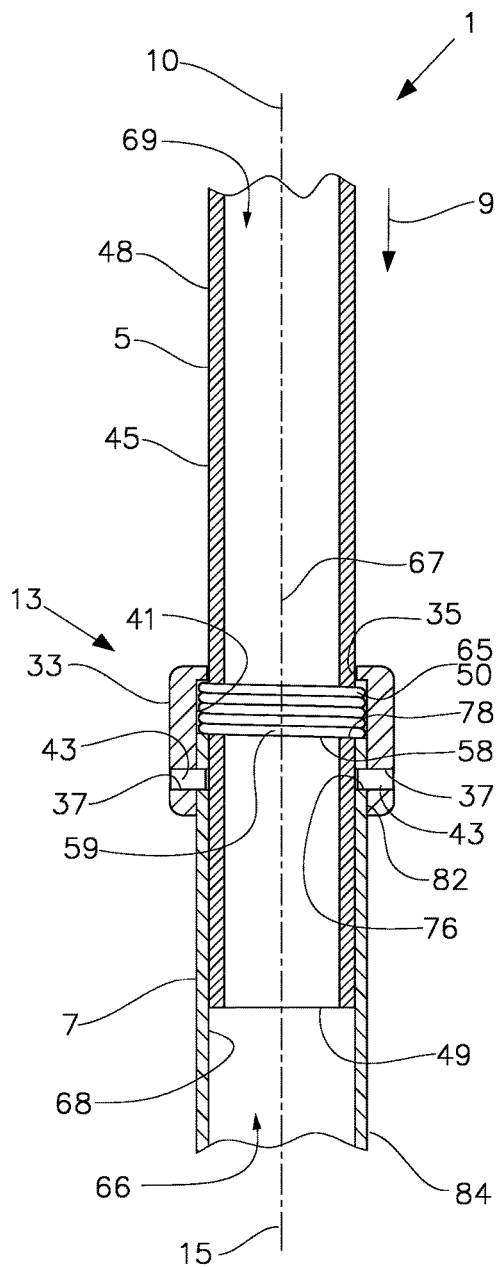
FIG. 2f is a cross-section view of the embodiment of FIG. 2a, taken along 88-88 and corresponding to the assembly sequence of FIG. 2d.

The helical bottom surface 58 of the spring 50 is nested with the helical abutment face 78 of the external member with the axial tang 62 extending within the slot 80 as described in FIGS. 2b and 2e. FIG. 2e shows arrangement of FIG. 2d with the collar 33 in phantom to more clearly show the arrangement of the spring 50, internal member 5, and external member 7. FIG. 2f shows the arrangement of FIG. 2d with the internal member 5, external member 7, and collar 33 in cross section to provide further illustration of this arrangement and also show the position of pins 43 that serve to engage the collar 33 to the external member 7.

Figure 2H:
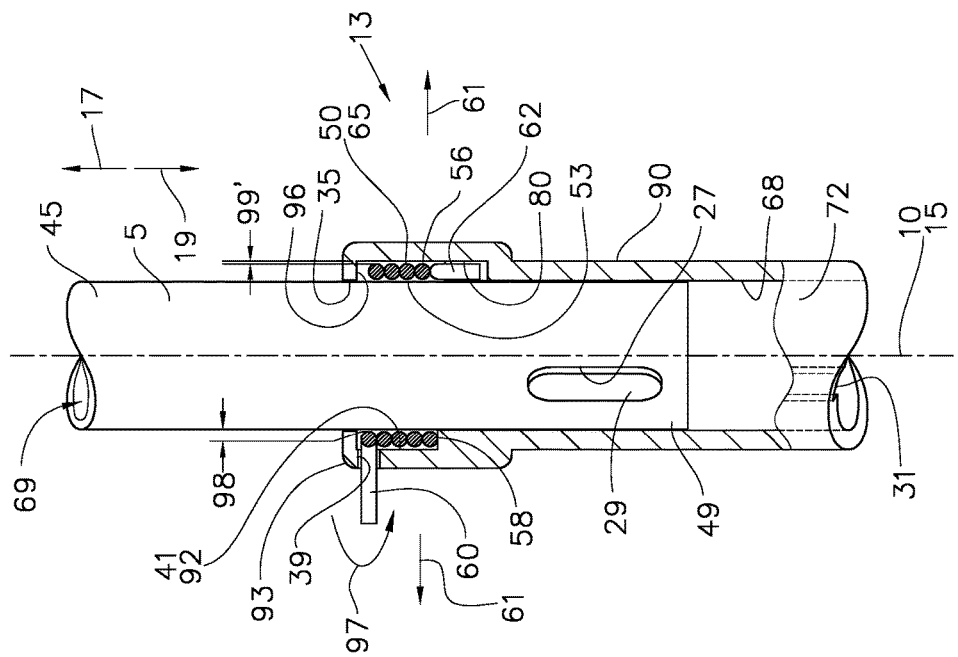
FIG. 2h is a partial cross-section view taken along 88-88, illustrating a simplified schematic view of the embodiment of FIG. 2a, with the collar, pins, and external member shown to be combined as a single monolithic external member, showing the spring next manipulated to a released orientation, with the gripping engagement released such that the internal member is axially displaceable relative to the external member.
Figure 2G:
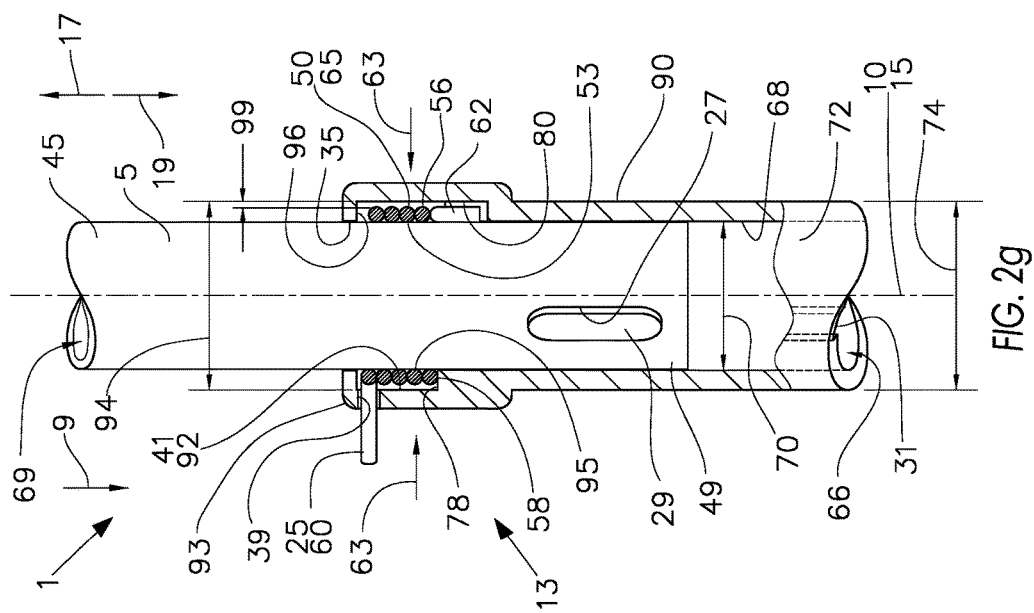
FIG. 2g is a partial cross-section view taken along 88-88, illustrating a simplified schematic view of the embodiment of FIG. 2a, with the collar, pins, and external member shown to be combined as a single monolithic external member, showing the spring initially manipulated to a relaxed, contracted, and axially locked orientation and having a gripping engagement at a gripping interface with the internal member such that the internal member is axially fixed relative to the external member.
Figure 2I:
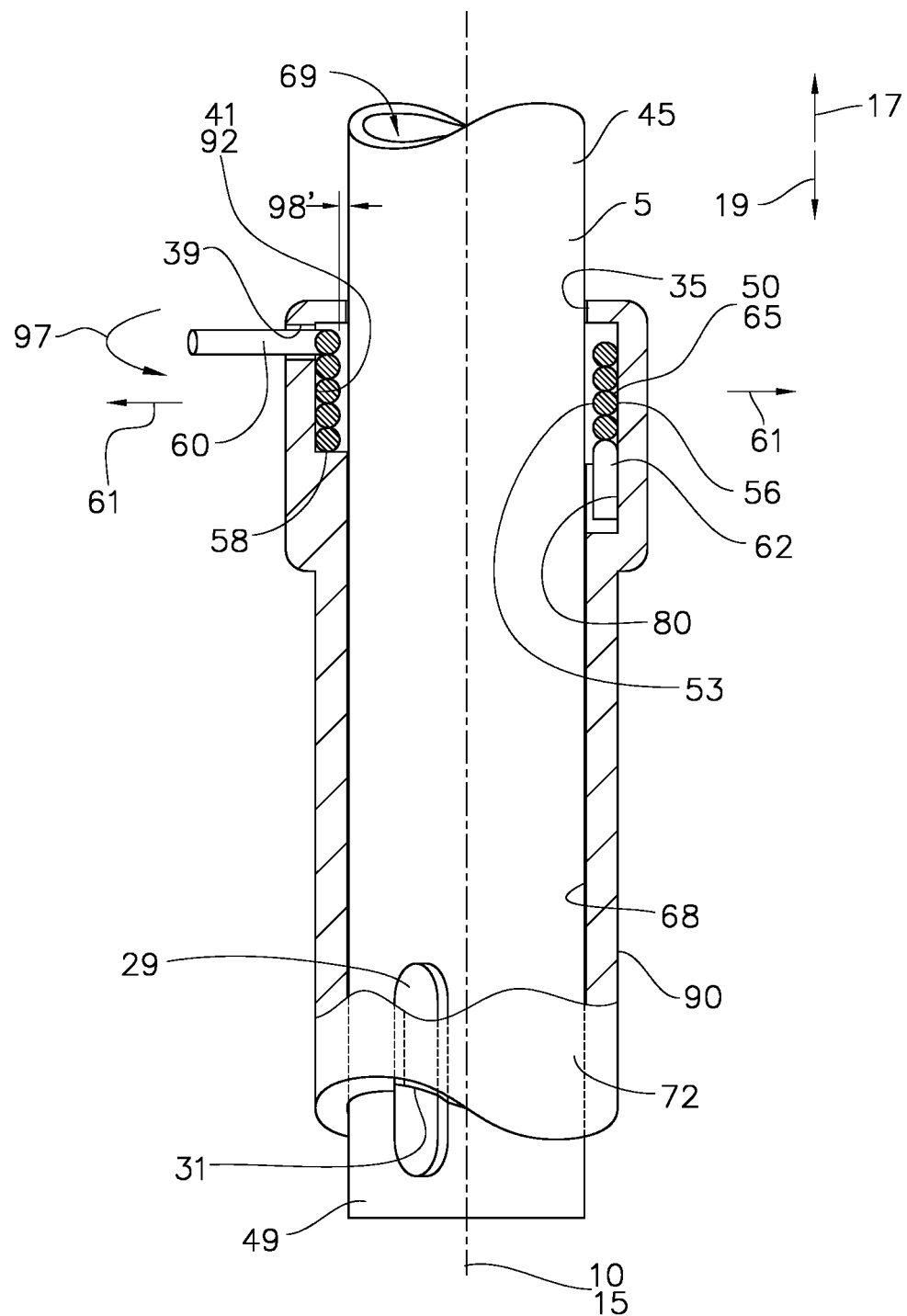
FIG. 2i is a partial cross-section view taken along 88-88, illustrating a simplified schematic view of the embodiment of FIG. 2a, with the collar, pins, and external member shown to be combined as a single monolithic external member, showing the spring next manipulated to a further expanded and released orientation, with the spring further expanded such that the coil is radially expanded to bear against the internal sidewall to permit free axial displacement relative to the external member.

FIGS. 2g-i show the collar 33 and the external member 7 as combined into a single schematic external member 90 to provide further simplicity and clarity of description when describing the operation of the seatpost assembly 1. These figures describe the sequential steps involved in operating the locking mechanism 13 to control the telescopic displacement between the internal member 5 and the external member 90 and to adjust the height of the seat 3 (not shown). To minimize redundancy, geometry and features of the collar 33 and external member 7 previously described hereinabove are repeated in description of the external member 90. The internal surface 68 of external member 90 is stepped to include: a relieved portion 92 of inside diameter 94 that is somewhat larger than the outside diameter 52 of the spring 50; a stepped portion 93 with an opening 35 smaller than the outside diameter 52 and sized to provide clearance for the external surface 45 of the internal member 5; a radially projecting transition face 96 extending between the relieved portion 92 and the stepped portion 35 that is functional to axially retain the spring 50 and restrict its upward displacement; an abutment face 78, slot 39, internal surface 68 of inside diameter 70, a keyway 31, and an external surface 72 of outside diameter 74 as described hereinabove.

FIG. 2g describes the locking mechanism 13 as engaged to restrict and restrain displacement of the internal member 5 relative to the external member 90 along the axial axis 15. Spring 50 is circumferentially wrapped to circumscribe and contact the external surface 45 of the internal member 5, with the axial tang 62 circumferentially engaged within the slot 80 and with the radial tang 60 extending through slot 39. The restraining surface is the portion of the external surface 45 that is in contact with the spring 50 at the gripping interface 95 and is shown to be a generally smooth surface without significant variation along the axial axis 15 that would otherwise engage with the coil 65. As previously described, the spring 50 had previously been unwound slightly to expand its inside diameter 52 to permit the internal member 5 to pass therethrough. FIG. 2g then shows this spring 50 as released toward its relaxed state in a radially inwardly contracted orientation. However the inside diameter 51 in its fully relaxed state is smaller than the outside diameter 47 of the internal member such that the spring 50, when its inside diameter 51 is contracted against the external surface 45, is preloaded such that the individual loops of the coil 65 each impart a radially inward normal force 63 to wrap, squeeze, constrict, bind, and grip the external surface 45 of the internal member 5 at a gripping interface 95, thus frictionally binding the spring 50 to the internal member 5 to restrict axial displacement therebetween. Gripping interface 95 is shown here as a circular circumferential gripping interface. Transition face 96 and abutment face 78 both serve to provide a radially overlying engagement with the spring 50. Throughout the range of axial displacement of the internal member 5 relative to the outer member 7, the spring 50 remains axially bound and constrained relative to the external member 90 by the transition face 96 in the axially upward direction 17 and by the abutment face 78 in the axially downward direction 19. As such, the internal member 5 is axially locked to the external member 90 by a frictional engagement between the spring 50 and the internal member 5 at a gripping interface 95. Since the external member 90 is fixed to the frame (not shown), the axial position of the seat 3 (not shown) is now also locked or fixed to the frame and restrained from axial displacement at gripping interface 95. The locking mechanism 13 is now considered to be in a "locked orientation" such that the height of the seat 3 is fixed, restrained, and/or restricted from being lowered. There is radial clearance 99 between the outside diameter 52 and inside diameter 94.

It is understood that increasing the number of individual loops or turns of the coil 65 will correspondingly increase the gripping interface 95, thereby increasing the axial load 9 that the spring 50 will support. As such, it is preferable that the coil 144 have at least two loops. It is further preferable that the coil 65 have at least 4 loops.

Further, the key 29 is radially overlying and circumferentially engaged to the keyway 31 to circumferentially key the internal member 5 directly to the external member 90, thereby also fixing the circumferential position of the seat 3 relative to external member 7 and the frame (not shown). This circumferentially keyed engagement is provided as a representative means to closely control the circumferential position of the seat 3 (not shown) throughout the axial displacement range of the internal member 5 relative to the external member 7, whether the spring 50 and locking mechanism 13 is locked or released. FIGS. 2g-i show the key 29 as axially fixed to the moveable internal member 5 and is circumferentially engaged to the axial keyway 31 of the fixed external member 90. Alternatively, a key may be axially fixed to the external member (that is axially fixed to the frame (not shown)) and is circumferentially engaged to an axial keyway of the moveable internal member 5. As a further alternative, a variety of other keying and/or anti-rotation means known in industry may be substituted. As a still further alternative, such a keying and/or anti-rotation means may be omitted, which will permit the internal member (and seat 3) to be circumferentially displaced and twisted relative to the external member 7 while the locking mechanism 13 and frictional engagement is released or disengaged. When the locking mechanism 13 and frictional engagement is active and engaged, this frictional gripping and binding engagement provides a degree of resistance to circumferential displacement and twisting of the internal member 5 relative to the spring 50 and external member 7 (by means of the keyed engagement between the axial tang 62 and slot 80).

In FIG. 2h, the radial tang 60 has next been manually displaced in direction 97, to circumferentially displace the radial tang 60 while the axial tang 62 remains circumferentially fixed and engaged within slot 80. Displacement of the radial tang 60 in direction 97 serves to unwind and unwrap the spring 50 such that its inside diameter 51 is radially outwardly expanded and enlarged in direction 61, resulting in a radial clearance 98 between the internal surface 54 of the spring 50 and the external surface 45 of the internal member 5. Since the former gripping constriction described in FIG. 2g has now been released, the internal member 5 may now be manually displaced in an axially extending direction 17 to raise the seat (not shown) or an retracting direction 19 to lower the seat (not shown). The key 29 is still circumferentially engaged to the keyway 31 to maintain circumferential alignment between the internal member 5 and the external member 90. Since the spring 50 is now radially expanded relative to FIG. 2g, the radial clearance 99' between the outside diameter 52 and inside diameter 94 has correspondingly been reduced.

The locking mechanism 13 of the seatpost assembly 1 is now considered to be an "initially released" orientation such that the height of the seat (not shown) is may be axially adjusted in the extending direction 17 and/or the retracting direction 19. Since the external surface 56 is shown in FIG. 2h to also have a clearance 99' with the internal sidewall 41, the individual loops of the coil 65 are not radially constrained and may inadvertently become radially shifted such that they may contact the external surface 45, thus grazing and lightly impinging on the free axial displacement of the internal member 5.

Next, as shown in FIG. 2i, the radial tang 60 has next been further displaced in direction 97 to further enlarge and radially expand the inside diameter 51 in direction 61 to increase the clearance 98' between inside diameter 51 and outside diameter 47. Correspondingly, the outside diameter 52 is also increased to a radially outwardly expanded orientation so that its loops radially contact and abut the internal sidewall 41, thus providing a radial limit stop to prevent the coil 65 from further expanding and overstressing its spring wire. The clearance 99' has now been eliminated. Since the coil 65 is now restricted from further radial expansion, the radial tang 60 is also restricted from travelling further in direction 97. This abutting contact also serves to provide radial alignment to the individual loops of the coil 65 and to now prevent these loops from becoming radially shifted and also to maintain a consistent clearance 98' between the inside diameter 52 and the external surface 45.

The locking mechanism 13 and spring 50 of the seatpost assembly 1 is now considered to be in a "fully released" orientation, allowing the smooth and unimpeded displacement of the internal member 5 relative to the spring 50 along the axial axis 15 in directions 17 and 19 to adjust the height and/or position of the seat 3 (not shown). After the desired position of the seat 3 is achieved, the radial tang 60 may be simply released, allowing the radial tang 60 to be circumferentially displaced in a direction opposite to direction 97 and allowing the spring 50 to elastically approach its free state, thus winding the coil 65 to reduce the inside diameter 52 and to grip and bindingly constrict the internal member 5. The seatpost assembly 1 is now locked and the telescopic displacement between the internal member 5 and external member 7 is restricted as described in FIG. 2g, thus maintaining the newly selected position of the seat 3.

It is noted that the spring 50 serves to circumferentially constrict and frictionally grip the internal member 5 in a gripping interface 95 as shown in FIG. 2g. This gripping interface 95 provides a frictional resistance that is preferably sufficient to restrain the internal member 5 from displacement in direction 19 to support the weight of the rider on the seat 3 as described herein. Since the spring 50 is also axially retained to the external member 7 by an overlie engagement with the transition face 96 and abutment face 78, the frictional interface may also serve to restrain the internal member 5 from displacement in the axially upward direction 17 and downward direction 19. There are several attributes of the spring 50 that may be varied to control amount of friction provided by the spring 50 at the gripping interface 95, such as: the wire material, the wire diameter 64, the cross-sectional wire profile, the number of individual loops of the coils 6, the inside diameter 52 at its relaxed state, the spring pre-load, among others. These attributes may be used to control the radial contact force and the friction applied by the spring 50 at the gripping interface 95, thus controlling the level of friction engagement between the spring 50 and internal member 5 when the seatpost assembly is in its axially locked state as shown in FIG. 2g.

When the axial load 9 exceeds the level of frictional engagement at the gripping interface 95, the internal member 5 may axially slip past the spring 50 while still providing a generally constant level of frictional resistance to displacement in direction 19. One advantage of this ability to control the level of frictional engagement is that the corresponding level of axial load 9 may be thereby adjusted to a load limit, allowing the internal member 5 to telescopically retract relative to the outer member 7 if a predetermined level of axial load 9 is exceeded. For example, the level of gripping and binding friction provided by the spring 50 may be adjusted such that the gripping interface 95 will easily support the weight of the rider under normal conditions, but will permit the gripping interface 95 to allow slippage of the internal member 5 if the rider were to inadvertently slip off the pedals (not shown) in a standing position and fall against the seat 3. The impact of the falling rider against the seat 3 could result in an axial load 9 that would exceed the weight of the rider under normal conditions, and the gripping interface 95 would permit slippage of the internal member 5, thus absorbing some of this impact and preventing harm to the rider. Thus, the ability to control and permit slippage of the gripping interface 95 may be utilized to provide an important safety feature of the seatpost assembly 1.

It is noted that the present invention is primarily directed at the locking mechanism 13 of the seatpost assembly 1. As such, some optional details of the seatpost assembly 1 that may be commonly included are omitted from this assembly for the sake of simplicity and clarity of description. For example, bushings are commonly included in the seatpost assembly 1 at the interface between the opening 66 and external surface 45 to insure smooth telescopic sliding and displacement, but such bushings are not shown here for purposes of clarity of description. Also, a counterbalance means, such as a spring or pneumatic means, are commonly utilized to counterbalance the weight of the moveable components (i.e. internal member 5 and seat 3) so that the seat 3 will be spontaneously raised when the locking mechanism 13 is released. However, such springs are not shown here for purposes of clarity of description. Also, sealing means are commonly utilized in the assembly, such as a wiper seal, a bellows seal, or other sealing means known in industry, to shield outside moisture and contaminants from entering the locking mechanism 13 and/or the telescopic interface. However, such sealing means is not shown here for purposes of clarity of description. Such optional details are also not included in the embodiments of FIGS. 3a-c, FIGS. 5a-c, FIGS. 6a-n, FIGS. 7a-e, FIGS. 8a-d, FIGS. 9a-d, and FIG. 10 for the sake of clarity of description.

In FIGS. 2a-j, the abutment face 78 is shown to be a flat surface that is orthogonal to the axial axis 15 to provide a blocking abutment interface with the bottom loop 59. The embodiment of FIG. 2k is identical to the embodiment of FIGS. 2a-j with the exception that the abutment face 102 of the external member 101 is angled and conical about the axial axis 15 with a conical angle 104. Thus, the bottom loop 59 of spring 50 contacts this conical abutment face 102 such that, when axial load 9 (i.e. corresponding to the weight of the rider) is applied to the internal member 5 (by means of the seat 3 (not shown) attached thereto), the conical angle 104 tends to wedge this bottom loop 59 radially inwardly to augment the normal force 106 and resultant friction at the gripping interface 95 associated with this bottom loop 59. Thus, this conical abutment face 102 is provided as a ramped surface to increase the constriction and gripping of the spring 50. Further, as the axial load 9 is increased, this wedging force 106 may be correspondingly increased, resulting in a self-energized gripping interface 95.

FIGS. 3a-c describe the arrangement of FIGS. 2a-j with the addition of an element that serves to bias the spring 50 toward greater wrapping constriction to bind and grip the internal member 5 as previously described. This biasing element may take on many forms that may serve to provide this bias, including wedges, cams, pneumatics, hydraulics, springs, among others. In the embodiment of FIGS. 3a-c, a compression spring 110 is utilized as a representative biasing element to provide a tangential or circumferential bias force 114 applied against the radial tang 60. This bias force 114 tends to wrap the radial tang 60 in the counterclockwise circumferential direction 112, which serves to wrap the coil 65 more tightly against the internal member 5 to provide an even greater radially inward normal force 63 to augment the frictional engagement between the spring 50 and the internal member 5 at the gripping interface 95. The increased frictional engagement serves to increase the axial load 9 that the gripping interface 95 can support. FIG. 3a shows the spring 50 and compression spring 110, with all of the other components removed for clarity. FIG. 3b shows the components of FIG. 3a and includes the internal member 5 to show the gripping interface 95. FIG. 3c corresponds to the assembly sequence of FIG. 2b and shows the components of FIG. 3b with the inclusion of the external member 7.

While FIG. 1 and FIGS. 2a-j describe a seatpost assembly 1 where the external member 7 is axially fixed to the frame (not shown) and the internal member 5 as axially displaceable relative to the internal member 5 and fixed to the seat 3. The axial displacement thus serves to selectively adjust the height of the seat 3. However, this is but one possible arrangement. FIG. 4 shows an alternate arrangement whereby the arrangement of FIGS. 2a-k is transposed to provide an upside down seatpost assembly 118 with an internal member 120 that is axially fixed to the frame (not shown) and an external member 122 that is axially displaceable relative to the internal member 120 and fixed to the seat 3. This axial displacement also serves to selectively adjust the height of the seat 3. The seatpost assembly 118 also includes a locking mechanism 124 with a collar 128 and a spring 127 that is manually operated upon by manipulating the radial tang 126. The locking mechanism 124 functions in a manner similar to that described in FIGS. 2a-j, with the exception that the components are upside-down. With the locking mechanism 124 in the locked position to provide a gripping interface as previously described, the seatpost assembly 118 is considered to be axially locked such that it may support axial load 9.

Figure 5A:
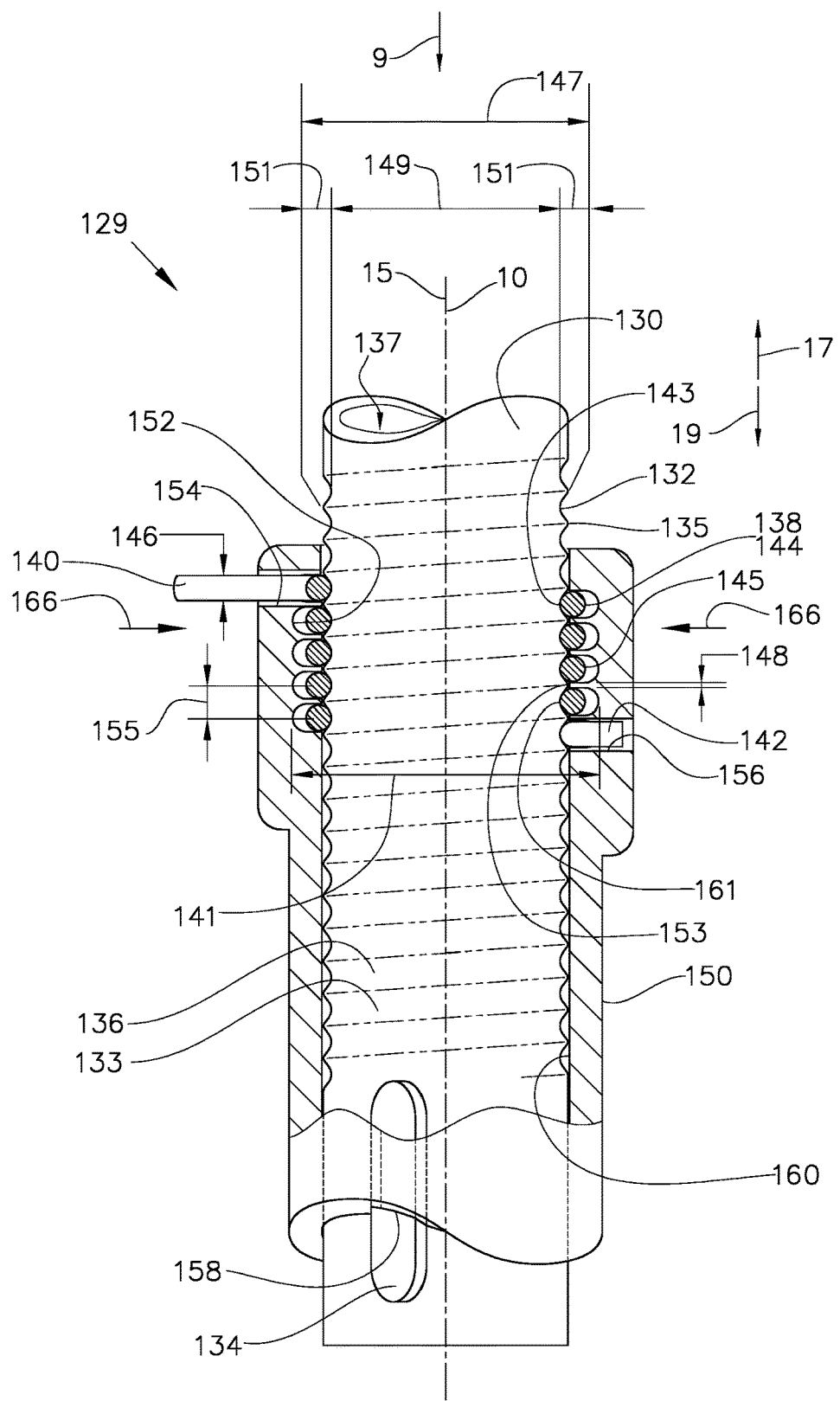
FIG. 5a is partial cross-section view of a third embodiment of the present invention, shown in simplified schematic form, including a configured surface of the internal member to interface with the spring and including a groove of the external member to support the individual loops of the spring, showing the spring manipulated to an engaged and locked orientation, with the spring first radially inwardly constricted to radially overlie and axially engage the configured surface of the internal member, while the spring is also radially overlying and axially locked within the groove of the external member.

It is noted that FIGS. 2a-j describe an internal member 5 with a smooth external surface 45, where the gripping interface 95 is generally a frictional interface that serves to bind and lock the axial position of the internal member 5 relative to the spring 50 and external member 7. It is further noted that only the bottom loop 59 is supported by the abutment face 78, while the other loops of the coil 65 are simply stacked on the loop directly below it and on the bottom loop 59. In contrast, FIGS. 5a-c describe an embodiment of a seatpost assembly 129 where the internal member 130 has a non-smooth and configured contour in its external surface 133 that includes a helical relief or groove 132 about the axial axis with a helical pitch that corresponds to the helical pitch of the coil 144 of the spring 138. The groove 132 may be considered as providing radially variable geometry that results in a configured portion 136 of the external surface 133 of the internal member 130 that serves to interface with the spring 138. The groove 132 represents a radially inwardly relieved portion of the configured surface 136 of root diameter 149, thus resulting in a corresponding helical ridge 135 of major diameter 147 axially adjacent the helical groove 132 that projects radially outwardly relative to the groove 132 as shown. As shown in these figures, the groove 132 has a semi-circular relief profile with a radius matched to the circular cross-section wire diameter 146 of the coil 144. Thus, the individual loops of the coil 144 may be nested within the groove 132 as shown in FIGS. 5a and 5c. Internal member 130 includes a key 134 that projects radially outwardly from external surface 133 and is also shown here as a hollow element to include opening 137.

Figure 5B:
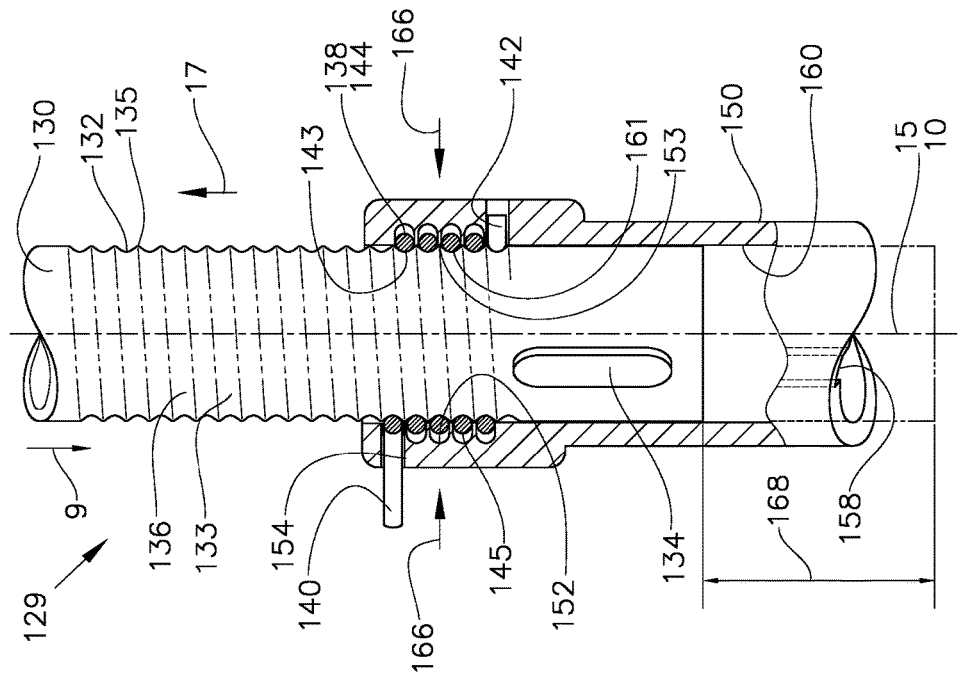
FIG. 5b is partial cross-section view of a the embodiment of FIG. 5a, showing the spring next manipulated to a released orientation, with the radially overlying engagement between the spring and configured surface released such that the internal member is axially displaceable relative to the external member.
Figure 5C:
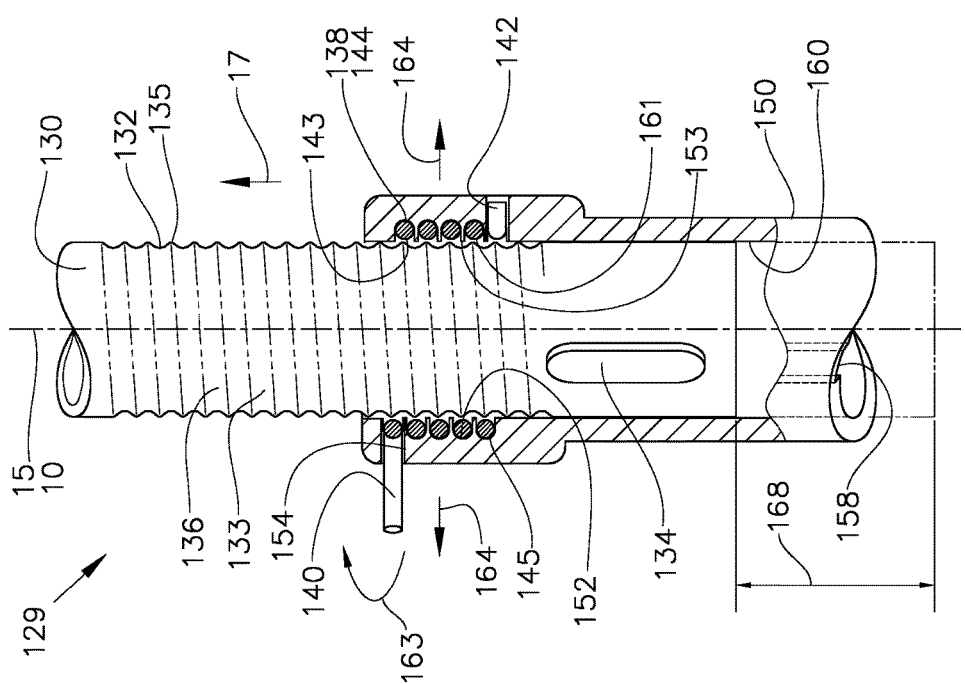
FIG. 5c is partial cross-section view of a the embodiment of FIG. 5a, showing the internal member as having next been selectively axially displaced to a raised position relative to the external member and with the spring again manipulated to a radially constricted and locked orientation to axially retain the internal member in this raised position relative to the external member.

FIGS. 5a-c describe the sequential steps involved in adjusting the seatpost assembly 129 to provide a height adjustment of the seat (not shown) between a lower seat position and a raised seat position. FIGS. 5a-c also show a schematic representation of the external member 150, where multiple components are combined together in a schematic representation of an external member 150 to provide a simplified representation for clarity of explanation in much the same way that the external member 90 of FIGS. 2g-i provides a schematic representation of combined components.

The external member 150 includes an opening 160 that extends along the axial axis 15 and is sized to receive the internal member 130 as shown. The external member 150 also includes: a slotted upper opening 154 that is generally identical to slot 39 and is sized to receive upper tang 140 of the spring 138 and to permit circumferential displacement of this upper tang 140; a radially extending hole 156 to receive the lower tang 142 while limiting its circumferential displacement; a helical internal groove 152 to receive the individual loops of the coil 144 as shown; and an axially extending keyway 158 to receive the key 134 of the internal member 130 in a manner identical to that described in FIGS. 2a-j. The groove 152 represents a radially outwardly relieved portion of the opening 160, thus resulting in a helical ridge 153 axially adjacent the helical groove 152 that projects radially inwardly relative to the groove 152 as shown. This ridge 153 extends radially inwardly between adjacent loops of the coil 144. The helical pitch of groove 152 corresponds to the helical pitch 155 of spring 138.

The spring 138 is similar to spring 50 of FIGS. 2a-k and is fabricated from circular wire of wire diameter 146 to include: a radially outwardly extending upper tang 140; a coil 144 of inside diameter 143; and a radially outwardly extending lower tang 142. In contrast to spring 50, where the individual loops of the coil 65 are axially stacked in a "solid" configuration, the individual loops of coil 144 are axially separated to include a gap 148 between axially adjacent loops. In other words, the helical pitch 155 of coil 144 is shown to be greater than the wire diameter 146. The gap 148 also corresponds to the axial width of helical ridge 153 as shown. It is noted that the inside diameter 143 of the spring 138 (in its free state) is preferably somewhat smaller than the root diameter 149 such that, when the spring 138 is released to constrict and bind against the internal member 130, the spring 138 will still be circumferentially stretched and pre-loaded to circumferentially constrict and radially grip the groove 132 at a binding interface 161 with the internal member 130. Since the inside diameter 143 is circular and the root diameter 149 is circular, the binding interface 161 is a circular and generally circumferential gripping interface.

As shown in FIG. 5a, the spring 138 is first assembled to the external member 150 such that the upper tang 140 extends through the upper opening 154 so that it may be manually manipulated by the user, the coils are radially overlying and nested within groove 152, and the lower tang 142 extends within hole 156 such that the lower tang 142 is circumferentially keyed to the external member 150 and will maintain its axial and circumferential position as the upper tang 140 is manipulated. The ridge 153 extends radially inwardly between the individual loops of the coil 144 to radially overlap and overlie the coil 144 and thus to axially support multiple loops of the coil 144. It may be seen that the radial overlie of ridge 153 serves to axially support these individual loops of the coil 144 to prevent axial displacement therebetween in both the extending direction 17 and retracting direction 19. This is in contrast to the abutment face 78 of FIGS. 2*a-j*, which only supports the underside of the bottom loop 59 of the coil 65 to support axial load 9 in direction 19 and/or the transition face 96, which only supports the extreme upper surface of the coil 65 to support load in direction 17.

The internal member 130 is assembled to the external member 150 and spring 138 as shown in FIG. 5*a*, with the key 134 engaged to keyway 158 to maintain circumferential alignment between the internal member 130 and external member150 while allowing an axial range of travel therebetween, as described in FIGS. 2*a-j*. The coil 144 is also nested within groove 132 such that the major diameter 147 and ridge 135 extends radially outwardly relative to the inside diameter 143 to radially overlie the coil 144.Thus, in addition to the frictional gripping at the binding interface 161 between the spring 138 and the internal member 130 in a manner identical to that described in FIG. 2*a-j*, there is also a mechanical overlie engagement between the coil 144 and the groove 132 to create an overlying interface therebetween and to provide further positional binding and locking to restrict and restrain displacement of the internal member 130 with respect to the external member 150 along the axial axis 15. The portion of the external surface 133 in contact with the spring 138 at the binding interface 161 is considered the restraining surface. It is preferable that the coil 144 have a radially inward pre-load such that the coil 144 is biased to be pressed and nested within groove 132 and to further support and reinforce the overlie engagement between the coil 144 and ridge 135 at the binding interface 161.

Alternatively, the inside diameter 143 of the spring 138 (in the free state) may be sized to be equal or even slightly larger than the root diameter 149 to eliminate the frictional gripping while still maintaining this overlie engagement such that this positional locking is provided only by the mechanical overlie engagement. Furthermore, as noted above, the coil 144 is radially overlying the groove 152 such that the spring 138 is axially engaged to the external member 150. Thus, as shown in FIG. 5*a*, internal member 130 is axially bound and engaged to the spring 138 and the spring 138 is axially engaged to the external member 150. The seatpost assembly 129 is considered here to be in an "axially locked" orientation such that it can support axial load 9.

It is noted that the radial depth 151 of groove 132 is shown in FIGS. 5*a-c* as being somewhat shallow and smaller than the circular cross sectional radius of the spring wire. This means that there is not a blocking overlie engagement between the coil 144 and the groove 132, but instead that there is a camming overlie engagement therebetween. In other words, axial displacement of the inner member could potentially cam against and radially expand the coil 144. However, it would require a very high axial load 9 to provide enough camming force to expand and enlarge the inside diameter 143 of the spring 138 beyond the major diameter 147, which would be required in order for the internal member 130 to axially slip relative to the spring 138 in direction 19. As such, under normal circumstances, this mechanical overlie engagement may be sufficient to axially lock the internal member 130 to the external member 150 and prevent axial slippage therebetween. However, in an unusual overload situation beyond a given load limit, such as when the rider inadvertently falls against the seat (not shown), the axial load 167 may be great enough such that the ridge 135 may cam against the coil 144, causing the coil 144 to expand to the extent that its inside diameter 143 will equal the major diameter 147 and permit the internal member 130 to slip past the spring 138 in direction 19, thereby yielding and absorbing some of the impact energy of this fall. Thus, like the frictional gripping interface 95 of FIGS. 2*a-k*, the mechanical overlie engagement of FIG. 5*a-c* may be tuned and configured to be utilized as an important safety feature to protect the rider in an overload situation.

It is understood that increasing the number of individual loops or turns of the coil 144 will correspondingly increase the binding interface 161 and the circumferential length of overlie engagement with ridge 135, thereby increasing the axial load 9 that the spring 138 will support. As such, it is preferable that the coil 144 have at least two loops. It is further preferable that the coil have at least 4 loops.

As shown in FIG. 5*b*, the upper tang 140 has next been manually manipulated to be circumferentially displaced in direction 163 while the lower tang 142 remains circumferentially fixed and engaged within hole 156. Displacement of the upper tang 140 in direction 163 serves to unwind the spring 138 such that its inside diameter 143 is radially expanded and enlarged in direction 164 to be greater than the major diameter 147. The coil 144 is preferably expanded in direction 164 until its radial outward surface radially abuts the radially outward major diameter 141 of groove 152. This abutting interface limits the radially outward expansion of the coil 144 and prevents the coil 144 wire from becoming overstressed beyond its elastic limit and also helps to control the radial centering of the coil to provide radial clearance for free axial displacement of the internal member 130 in direction 162. The binding interface 161 and the radial overlie engagement (between spring 138 and internal member 130) are now both released, allowing the internal member 130 to slip past the spring 138 such that the internal member 130 may now be manually displaced in axially extending direction 17 to raise the seat 3 (not shown), or in the retracting direction 19 to lower the seat 3 (not shown). The key 134 is still circumferentially engaged to the keyway 158 to maintain circumferential alignment between the internal member 130 and the external member 150.

The locking mechanism (i.e. spring 138 and a portion of the external member 150) of the seatpost assembly 129 is now considered to be in a "released" orientation such that the height of the seat 3 (not shown) may be axially adjusted in the extending direction 17 and/or the retracting direction 19. The internal member 130 has been axially displaced in direction 17 by distance 168 relative to the external member 150 to selectively raise the seat 3 (not shown) from its axial position described in FIG. 5*a*.

Next, as shown in FIG. 5*c*, the upper tang 140 has been manually released toward its relaxed state such that the spring 138 is restored to its position described in FIG. 5*a*. The coil 144 is now radially inwardly collapsed and contracted in direction 166 to be nested in groove 132 to restore the binding interface 161 and mechanical overlie engagement described in FIG. 5*a* and to lock and maintain this newly axially displaced position of the internal member 130 relative to the external member 150. The locking mechanism (i.e. spring 138 and a portion of the external member 150 and internal member 130) of the seatpost assembly 129 is returned to its locked orientation such that the height of the seat 3 (not shown) is now fixed in directions 17 and/or 19 to support the seat 3 in normal use. As described hereinabove, the external member 150 is axially and circumferentially fixed to the frame (not shown), while the seat 3 is axially fixed to the internal member 130. Telescopically raising and lowering the internal member 150 relative to the internal member 130 serves to correspondingly raise and lower the seat 3 to the desired height selected by the rider.

It is noted that elements of the embodiment of FIGS. 5a-c may be combined with the embodiment of FIGS. 2a-j. For example, in FIGS. 2a-j, the internal member 130, with helical groove 132 of FIGS. 5a-c, may be substituted for the smooth internal member 5 of FIGS. 2a-j. In another example, in FIGS. 5a-c, the smooth internal member 5 of FIGS. 2a-j may be substituted for the grooved internal member 130 of FIGS. 5a-c.

Figures 6A, 6B:
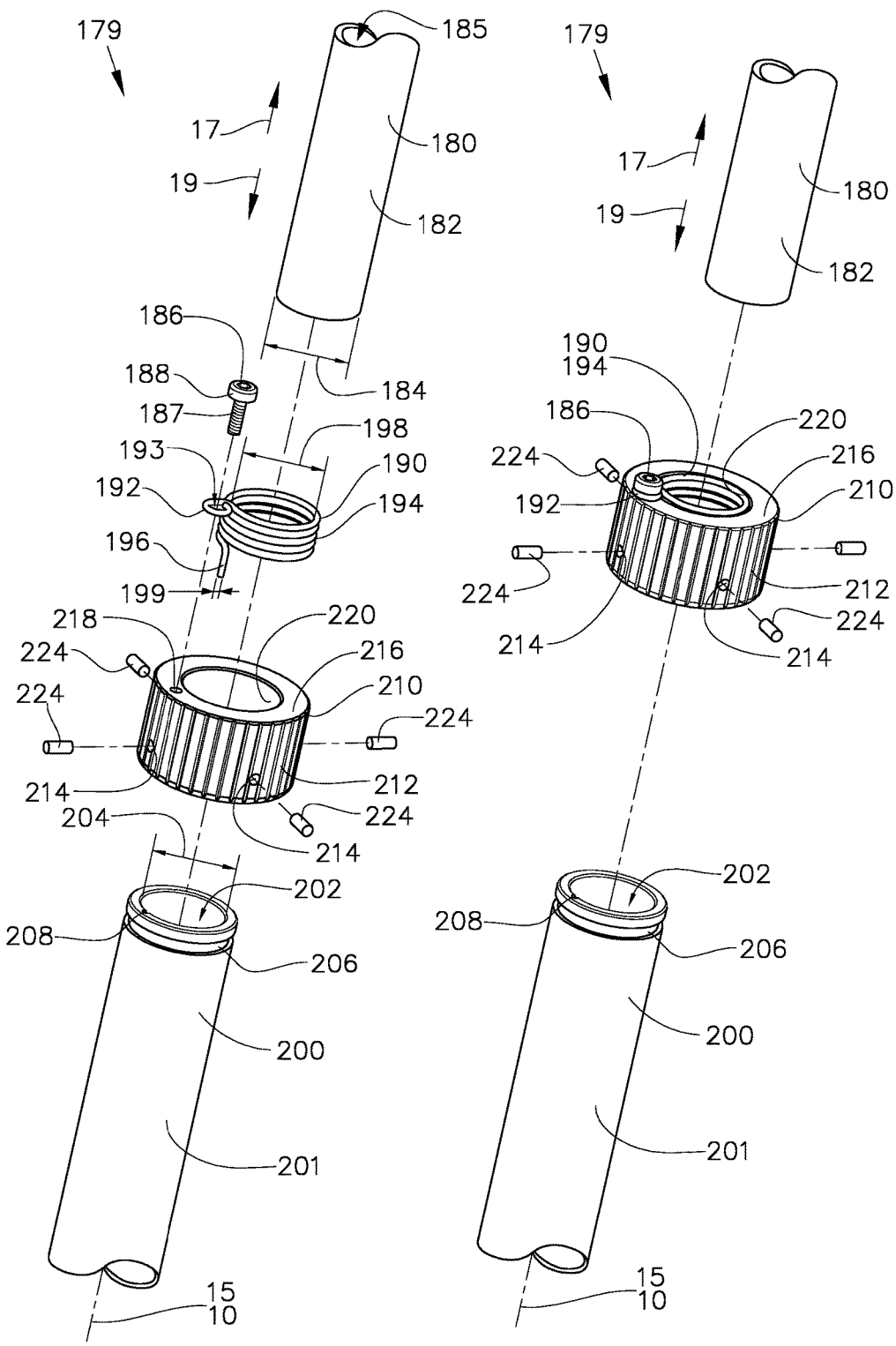
FIG. 6a is an exploded perspective view of a fourth embodiment of the seatpost assembly.
FIG. 6b is an exploded perspective view of the embodiment of FIG. 6a, with the spring first pre-assembled to the collar by means of a screw.
Figure 6H:
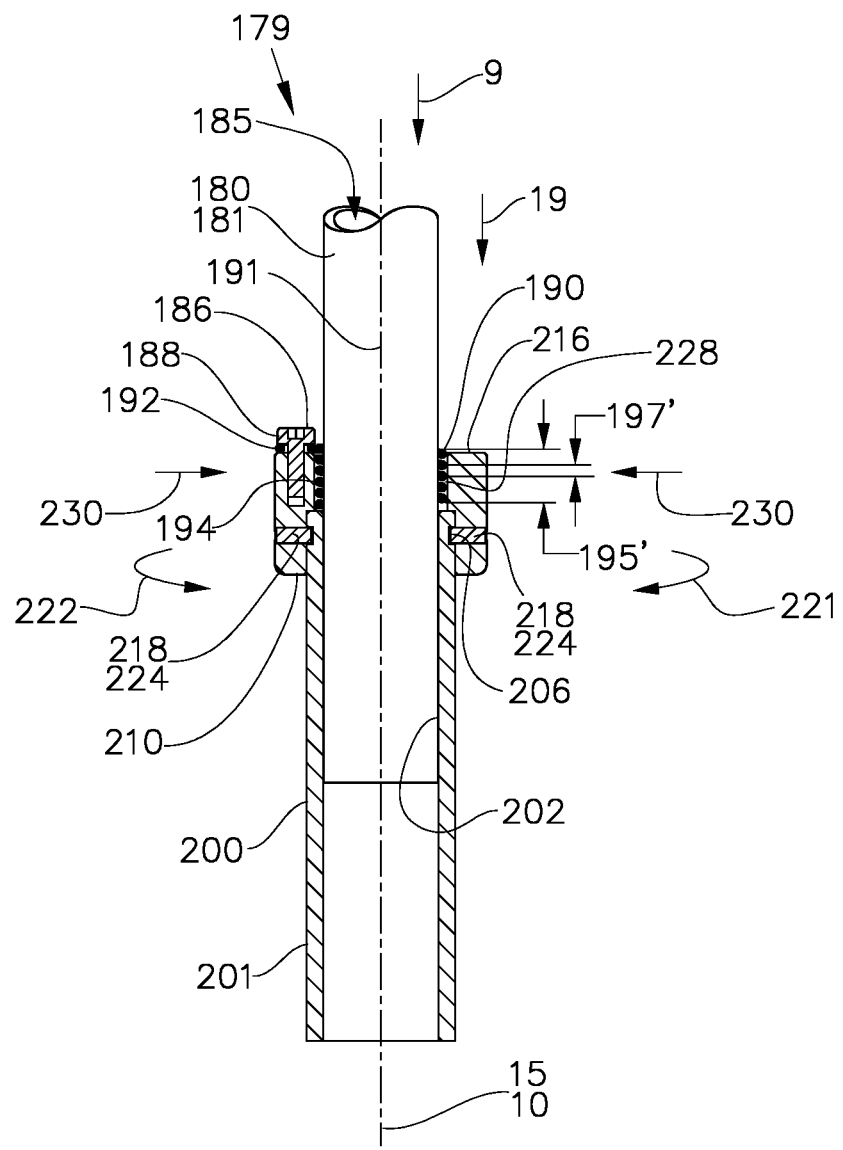
FIG. 6h is a partial cross-section view, taken along 232-232, of the embodiment of FIG. 6a, and corresponding to the assembly sequence of FIG. 6d.

While FIGS. 2a-k and 5a-c show the springs 50 and 138 as supported from below by abutment faces 78 and 102 and ridge 153 respectively to resist axial load 9, the embodiment of FIGS. 6a-n describes a seatpost assembly 179 where the spring 190 is axially supported from above and is effectively "hanging" from its upper tang 192. As shown in FIGS. 6a-n, internal member 180 includes external surface 182 and is a circular cylindrical tubular element with an outside diameter 184 and an opening 185 therethrough. External member 200 includes: An external surface 201 to interface with the seat tube (not shown) of a bicycle frame (not shown) in the conventional manner; an axial opening 202 that is sized to provide a close sliding telescopic fit with the external surface 182 of the internal member 180; a circumferential groove 206 adjacent opening 202 to provide an engagement track for pins 224; and an axial slot 208 adjacent opening 202 to slidably receive the lower tang 196 of the spring 190.

The spring 190, as particularly detailed in FIG. 6a and FIGS. 6i-L, is similar to spring 50 of FIGS. 2a-k and is fabricated from circular wire of wire diameter 199 to include: a hooked upper tang 192 that is formed into a loop to include an axial hole 193 therein; a coil 194 of inside diameter 198; and an axially downwardly extending lower tang 196. The individual loops of the coil 194 are shown in their free state to be axially stacked and "solid" with a helical pitch 197 equal to the wire diameter 199 such that there is no appreciable axial gap between adjoining loops, and the spring 190 has a stack height 195 in its free state. It is noted that the inside diameter 198 of the spring 190 (in its free state) is preferably somewhat smaller than the outside diameter 184 such that, when the spring 190 is assembled to the internal member 180, the spring 190 will be circumferentially stretched and pre-loaded to circumferentially constrict and radially grip the external surface 182 at a gripping interface 226 with the internal member 180.

The collar 210 includes: an opening 220 therethrough to receive the internal member 180; an end face 216 with an internally threaded hole 218 therein to threadably receive the screw 186; a knurled external surface 212 to aid in manual manipulation of the collar 190; and radial holes 214 to receive mating pins 224 in a locating press fit therebetween. Screw 186 is of conventional configuration and includes a head 188 and an externally threaded shank to threadably mate with hole 218.

FIG. 6a shows these components in exploded view prior to assembly. Next, the spring 190 is pre-assembled to the collar 210 by utilizing the screw 186 to extend through opening 193 to solidly secure the upper tang 192 to the end face 216 of collar 210 as shown in FIG. 6b. The coil 194 is axially overlapping within the opening 220.

Next, as shown in FIG. 6c, this pre-assembly is assembled in direction 19 to the external member 200, with the lower tang 196 nested within slot 208 such that the lower tang has freedom to be displaced axially but is also circumferentially keyed relative to the external member 200. Pins 224 are pressed within their respective holes such that they protrude radially inwardly from the collar 210 to radially overlap and engage the groove 204 such that the collar 210 is axially engaged and retained to the external member 200, but is also free to be circumferentially rotated relative to the external member 200.

Since the lower tab 196 is circumferentially engaged and fixed to the external member 200 and the upper tab 192 is fixed to the face 216 of the collar 210, circumferential rotation of the collar 210 in direction 221 will serve to further wind and "tighten" the coil 194 of the spring 190, while rotation of the collar 210 in direction 222 will serve to unwind and "loosen" the coil 194 of the spring 190 to enlarge and increase the inside diameter 198 of the coil 194.

It is noted that the inside diameter 198 of the coil 194 (in its free state) is somewhat smaller than the outside diameter 184 of the internal member 180 such that the spring 190 must be unwound by manually rotating the collar 210 in direction 222 to elastically enlarge and pre-load the coil 194 to increase the inside diameter 198 to provide the necessary clearance such that the internal member 180 may be inserted therein. As shown in FIGS. 6d, the collar 210 has been temporarily rotated in direction 222 the internal member 180 has been inserted in direction 19 within the coil 194 of the spring and to axially overlap the opening 202 of the external member 200. It is noted that the circumferentially keyed engagement (i.e. engagement between key 29 and keyway 31 of FIGS. 2a-j) between the internal member 180 and external member 200 is not shown in FIGS. 6a-n for clarity of illustration. It is understood that such a circumferentially keyed engagement is preferably included in the embodiment of FIGS. 6a-n as well.

As shown in FIGS. 6e-f, 6i-j, and 6m, the collar 210 may next be released to rotate in direction 221, allowing the coil 194 to elastically wind itself and return toward its free state, which causes the inside diameter 198 to be reduced until the coil 190 contacts the external surface 182. Since there still remains some circumferential deflection in the coil 194, the coil 194 remains pre-loaded to further constrict, bind, and frictionally grip the external surface 182 of the internal member 180 at a gripping interface 226 in a manner similar to that described in FIGS. 2a-j. This serves to axially engage, lock, or otherwise restrict the axial displacement of the internal member 180 relative to the spring 190 and also, by means of the screw 186 and collar 210, to the external member 200 as well. The seatpost assembly 179 is now considered to be in an axially locked orientation such that it may now support axial load 9.

In contrast to the embodiment of FIGS. 2a-k, the spring 190 (and internal member 180 frictionally connected thereto) is essentially "hanging" from its upper tang 192. Thus, the lower tang 196 and loops of the coil are unrestricted from small axial displacement in the downward direction 19. Next, with the applied axial load 9, such as the load associated with the rider's weight on the seat 3 (not shown), as shown in FIGS. 6g-h, 6k-L, and 6n, the gripping interface 226 may permit a small amount of axial slippage, permitting the internal member 180 to be slightly axially displaced downwardly in direction 19. This downward displacement causes the individual loops to become axially separated with a slight gap 228 between adjoining coils. This result is a slight amount of elastic axial stretch of the coil 194, with a corresponding increase in its helical pitch 197' and axial height 195' as shown in FIGS. 6g-h, 6k, 6L, and 6n. Since the lower tang 196 is circumferentially constrained within the slot 208, this axially downward stretch causes the coil 194 to wrap more tightly around the external surface 182 to further constrict and grip the internal member 180 at the gripping interface 226. Thus, this arrangement also provides a self-energized gripping feature, whereby increased axial loading 9 causes increased gripping and axial locking between the internal member 180 and the external member 200 to further restrict or arrest any further axial displacement of the internal member 180 in direction 19 and to support even greater axial load 9. The seatpost assembly 179 is now in the locked orientation to restrict axially downward displacement of the inner member 180 relative to the outer member 200.

It is noted, when pulling the inner member 180 axially upwardly in direction 17 relative to the external member 200, the gaps 228 may be reduced, thereby reducing the corresponding frictional engagement at the gripping interface 226. As such, the arrangement of FIGS. 6a-n may be utilized to create a "one-way" locking mechanism such that the frictional gripping friction provided by the gripping interface 226 is increased as the inner member 180 is pushed (by load 9) in the axially downward direction 19 relative to the external member and may be correspondingly reduced when the inner member 180 is pulled axially upwardly in the axially upward direction 17 relative to the external member.

The collar 210 may later be manually rotated in direction 222 relative to external member 200 to again enlarge the coil 194 and release the gripping interface 226, to permit the telescopic raising or lowering of the internal member 180 thereby adjusting the seat height. Releasing the collar 210 and allowing it to rotate in direction 221 will again restrict and/or lock the seat height at its newly adjusted position.

As also described hereinabove, the external member 200 is axially and circumferentially fixed to the frame (not shown), while the seat (not shown) is axially fixed to the internal member 180. Telescopically raising and lowering the internal member 180 relative to the external member 200 serves to correspondingly raise and lower the seat (not shown) to the desired height selected by the rider.

It is noted that the embodiments of FIGS. 2a-k, 5a-c, and 6a-n show the spring as directly gripping and and/or directly engaging the moveable element, which is also labeled as the internal member in these figures. In contrast, the embodiment of FIGS. 7a-e describe an arrangement wherein the spring 50 indirectly grips the moveable element. In other words, as shown in FIGS. 7a-e, the spring 50 constricts radially inwardly against the external member, causing the external member to be displaced radially inwardly to grip and bind against the internal member.

Figures 7A, 7B:
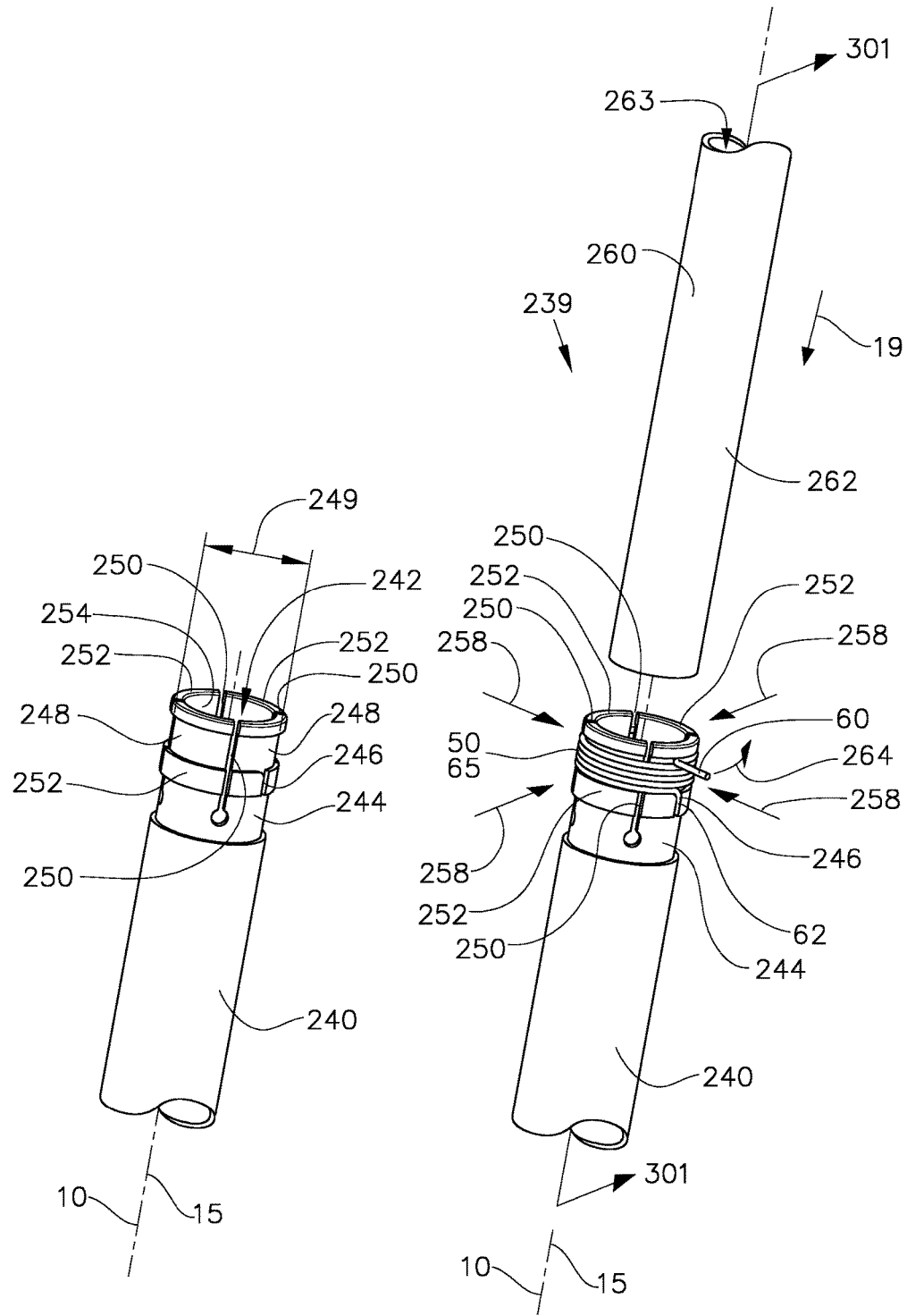
FIG. 7a is a perspective view of a fifth embodiment of the present invention showing only the external member, prior to installation of the spring and internal member.
FIG. 7b is a perspective view of the embodiment of the FIG. 7a showing the spring as first pre-assembled to the external member, and with the internal member positioned for subsequent assembly with the external member.

As shown in FIG. 7a, the external member 240 includes: an axially extending opening 242 to receive the internal member 260; a series of circumferentially spaced axial slots 250, resulting in a corresponding series of circumferentially spaced and axially extending flex fingers 252; a circumferential relief 244 to thin the wall thickness of the external member 240 and thereby promote radial flexure of flex fingers 252; and an axially extending slot 246 to receive the lower axial tang 62 of spring 50. The flex fingers 252 each include: an internal surface 254 for gripping interface with the internal member 260 and a circumferential relief 248 to receive and axially position the coil 65 of the spring 50. The outside diameter 249 of relief 248 is sized to be somewhat larger than the inside diameter 52 of coil 65 in its relaxed state. Internal member 260 is a circular cylindrical tubular element to include external surface 262 and internal opening 263.

As shown in FIG. 7b, the spring 50 is identical to that described in FIGS. 2a-j and is assembled to the external member 240 such that the coil 65 is nested within relief 248 and the axial tang is nested in slot 246. The internal member 260 includes external surface 262. It is noted that the inside diameter 52 of the spring 50 (in its free state) is somewhat smaller than the outside diameter 249 such that, when the spring 50 is assembled to the relief 248, the coil 65 will be circumferentially stretched and pre-loaded to constrict and flex the fingers 252 radially inwardly, thereby pressing the internal surface 254 (adjacent the fingers 252) radially inwardly. Next, as shown in FIGS. 7b and 7d, the radial tang 60 is circumferentially displaced in direction 264, which serves to elastically unwind and "loosen" the coil 65 of the spring 50 to enlarge and increase the inside diameter 52 of the coil 65, allowing the flex fingers 252 to flex radially outwardly and return to their free state, thus expanding the opening 242 to provide the requisite clearance to receive the internal member 260.

Figure 7C:
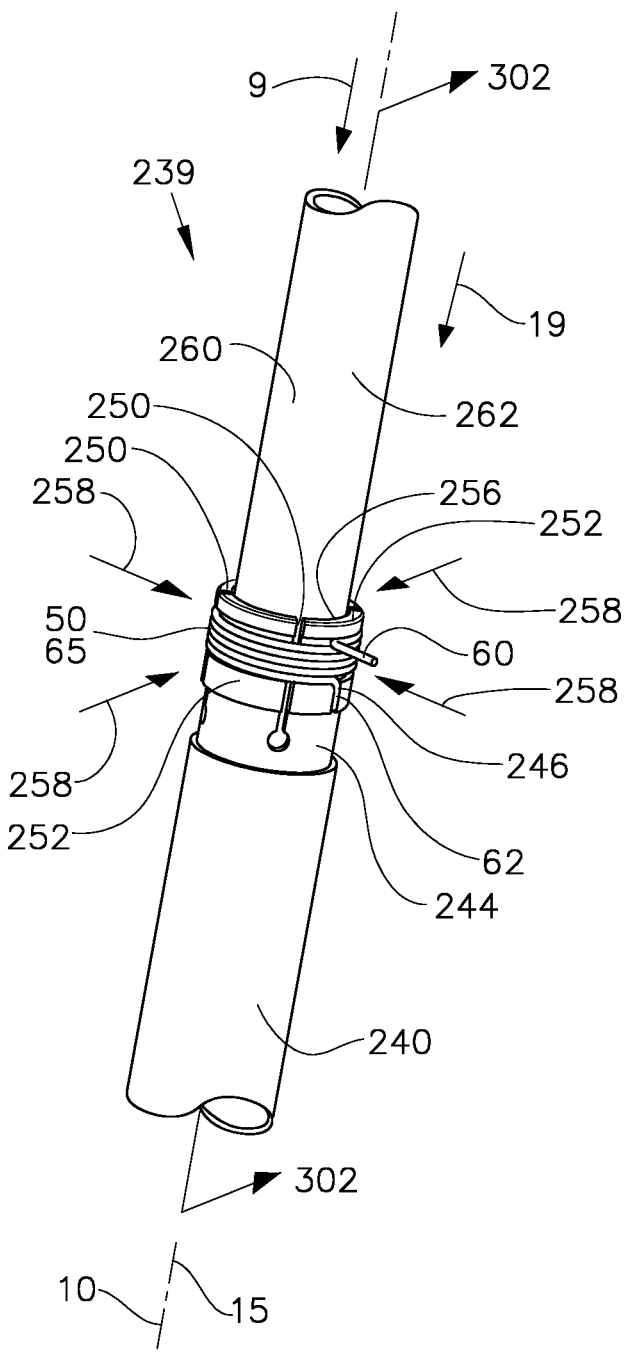
FIG. 7c is a perspective view of the embodiment of the FIG. 7a showing the internal member as next assembled to the pre-assembly of FIG. 7b.

As shown in FIGS. 7c and 7e, the internal member 260 has next been axially assembled in direction 19 to be positioned within opening 242 and to axially overlap the external member 240 and to create seatpost assembly 239. The radial tang 60 has been released to be displaced in direction 265 and the coil 65 is has wound more tightly toward its relaxed state such that its residual pre-load again serves to bias, constrict, and flex the fingers 252 radially inwardly, thereby pressing the internal surface 254 (adjacent the fingers 252) radially inwardly in direction 258. This radially inward flexure serves to bias and press the internal surfaces 254 radially inwardly in associated directions 258 and to bind and frictionally grip the external surface 262 of the internal member 260 at the gripping interface 256, thereby frictionally binding and/or locking the axial position of the internal member 260 relative to the external member 240. The seatpost assembly 239 is now considered to be in an axially locked orientation such that it may support axial load 9. It may be considered that the spring 50 serves to energize and activate the frictional engagement between the external surface 262 and the internal surface 254 at the gripping interface 256 therebetween. Rotating the radial tang 60 again in direction 264 will release the gripping interface 256, corresponding to a release orientation of the seatpost assembly 239, and permit the axial height of the internal member 260 to be selectively adjusted to a second axial position, while releasing the axial tang 60 to return to its original position will again restrict and/or lock the seat height in this second position.

While the internal surfaces 254 and external surface 262 are shown in FIGS. 6a-e to be smooth cylindrical surfaces, it is envisioned that these surfaces may alternatively be configured surfaces that interlock with each other. For example, both internal surfaces 254 and external surface 262 may include a series of circumferential ridges, where the ridges of the internal surfaces 254 may interlock and overlie the ridges of external surface 262 to provide a degree of mechanical interlock and mechanical engagement therebetween to further axially lock the seatpost assembly 239. FIG. 7d corresponds to FIG. 7b and FIG. 7e corresponds to FIG. 7c.

When considered generically, the external member 240 serves as an intermediate gripping element, wherein the spring 50 provides a radially inward force against the external member 240 to press and energize the external member 240 radially inwardly into a gripping and/or mechanical engagement with the internal member 260. In other words, the spring 50 provides the gripping force and/or displacement to energize and press the intermediate gripping element, while the intermediate gripping element provides the gripping surface for the gripping interface 256. In comparison, in the embodiments of FIGS. 2*a-k*, 5*a-c*, and 6*a-n*, the spring provides both the gripping force and the gripping surface for the gripping interface.

Figure 8A:
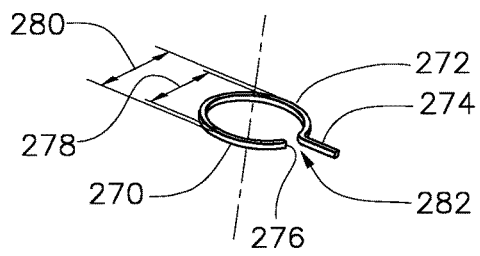
FIG. 8a is a perspective view of a single spring of a sixth embodiment of the present invention, shown as having a generally flat coil with only a singular loop.

While the previous embodiments show the elastic spring as having a helically wrapped coil of wire having of a multiplicity of individual overlapping loops that have a circumferential wrap greater than 360 degrees, the spring may alternatively have only a singular loop with a circumferential wrap not greater than 360 degrees. Such an arrangement is described in the embodiment of FIG. 8*a-c*, where the spring 270 includes a single loop 272, with an inside diameter 278 and outside diameter 280, that is shown in FIG. 8*a* to be generally flat and non-helical. Spring 270 also includes: a radially outwardly extending tang 274 for manual manipulation; an abutment end 276 for engagement with a circumferentially fixed feature (not shown) of the external member 290; and a circumferential gap 282 between the tang 274 and abutment end 276.

Spring 270 is shown here to be made of wire with a generally constant cross section dimension. It is understood that the cross section of the spring loop 272 may alternatively have a variable cross section dimension. Such an arrangement may be achieved by stamping the spring out of sheet metal in a process similar to that used to form conventional snaprings. For example, it may be preferable to have the cross sectional width of the loop be wider at a location circumferentially opposite to the gap 282 and to transition to a narrower width at the circumferential locations adjacent the tang 274 and abutment end 276. Such a variable cross section width is well understood in the design of conventional snaprings and may be utilized to insure that the radial deflection of the loop 272 is generally constant around its circumference.

Figure 8B:
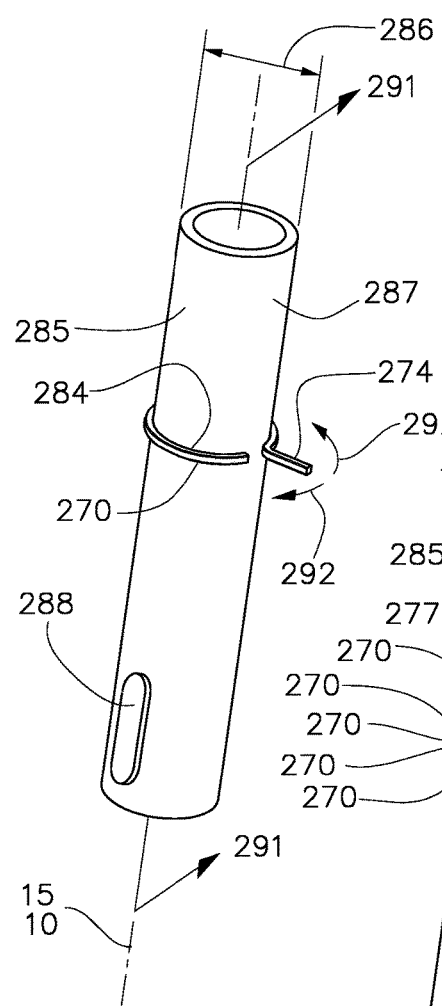
FIG. 8b is a perspective view of the spring of FIG. 8a in its assembled position to constrict with the internal member.

FIG. 8*b* shows the interface between the spring 270 and the internal member 285. Internal member 285 is a generally circular cylindrical element of outside diameter 286, having an external surface 287 with a key 288 projecting radially outwardly therefrom. Internal member 285 generically corresponds to internal member 5 of FIG. 1 to which the seat 3 (not shown) is fixed. The inside diameter 278 of the spring 270 (in its free state) is somewhat smaller than the outside diameter 286 such that, when the spring 270 is assembled axially to the internal member 285, the loop 272 will be circumferentially stretched and pre-loaded to circumferentially constrict and radially inwardly grip the internal member 285 at a gripping interface 284 with the external surface 287.

Figure 8C:
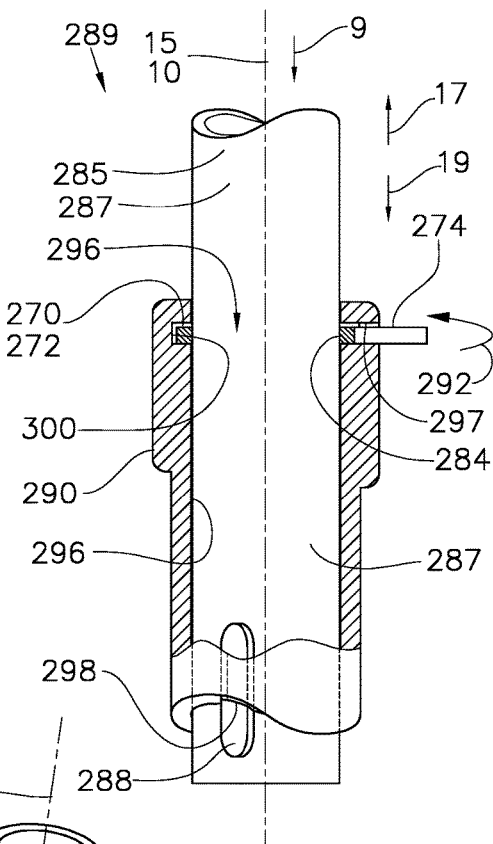
FIG. 8c is a partial cross section view, taken along 291-291, of the embodiment of FIG. 8a, corresponding to the assembly sequence of FIG. 2g, showing the components of FIG. 8b as assembled to the external member.

FIG. 8*c* describes the complete seatpost assembly 285 that is shown to also include the external member 290, which includes: an axially extending opening 296 to receive the internal member 285, a circumferential groove 300 within the opening 296 to receive the spring 270; a circumferential slot 297 for through-passage of the tang 274; and a keyway 298 to receive the key 288 in a circumferentially keyed engagement identical to that described in FIGS. 2*a-j*. The spring 270 is fitted within groove 300 with the tang 274 extending through slot 297 and with the abutment end 276 circumferentially keyed to the external member 290 by means of a radially inward abutment projection (not shown) of the external element 290 that is located adjacent the groove 300 and circumferentially positioned within the gap 282. The abutment projection serves to provide a blocking abutment engagement abutting the abutment end 276 to limit circumferential displacement of the abutment end 276. The internal member 285 is positioned within the opening 296 and extending through the center of the loop 272 while the key 288 is engaged with keyway 298 as shown in FIG. 8*c*.

With the abutment end 276 keyed to the external member 290, manually rotating the tang 274 in direction 292 serves to expand and enlarge the inside diameter 278 of the loop 272 and to permit the free axial displacement of the internal member 285 relative to the external member 290, thereby permitting the free adjustment of the height of the seat 3 (not shown). Next, the tang 274 may be released, allowing the spring 270 to seek its relaxed state such that the inside diameter 278 is reduced to constrict and frictionally grip the internal member 285, thus restricting the axially downward displacement of the internal member 285 with respect to the external member 290, thereby locking the axial position of the seat 3. The seatpost assembly 289 is now considered to be in an axially locked orientation such that it may support axial load 9. With the exception of the configuration of the spring 270 and the corresponding geometry of the external member 290, the embodiment of FIGS. 8*a-c* is very similar to the embodiment of FIGS. 2*a-j*.

Figure 8D:
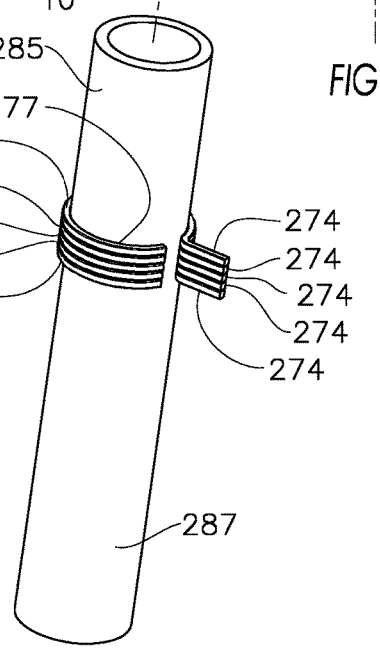
FIG. 8d is a perspective view of an alternate embodiment similar to that of FIGS. 8a-c, corresponding to the assembly sequence of FIG. 8b, illustrating a multiplicity of springs assembled in their constricted position to constrict with the internal member.

FIG. 8*d* is similar to FIG. 8*b*, with the exception that an axially stacked series of multiple individual springs 270 is utilized. When the external member 290 is modified to accept this stacked series of springs 270, the frictional gripping provided by these springs 270 at a corresponding multiple of gripping interfaces 277 is correspondingly increased to provide a more firm and positive restraint against the axial load 9 and the corresponding axial displacement of the seat 3 (not shown) when the seatpost assembly (not shown) is in the locked orientation shown here. The multiple springs 270 may be considered to correspond to the multiple loops associated with the coil 65 of spring 50 shown in FIGS. 2*a-j*.

The embodiment of FIGS. 9*a-d* has similarities to both the embodiment of FIGS. 5*a-c* and FIGS. 8*a-c*. Like FIG. 5*a-c*, FIGS. 9*a-c* includes a mechanical engagement between the spring 310 and the internal member 320 and like FIGS. 9*a-c*, the spring 310 has only a singular loop 311 with a circumferential wrap not greater than 360 degrees. The loop 311 of spring 310 is also shown to be generally flat and non-helical. Unlike FIGS. 5*a-c*, the spring 310 has a blocking engagement with the internal member 320 at engagement interface 339.

Figure 9A:
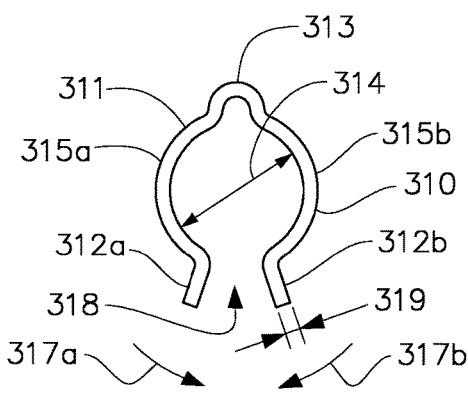
FIG. 9a is an orthogonal view of the spring of a seventh embodiment of the present invention, wherein the spring is shown as having a generally flat coil with only a singular loop and is shown in its relaxed state with a smaller and contracted inside diameter.
Figure 9B:
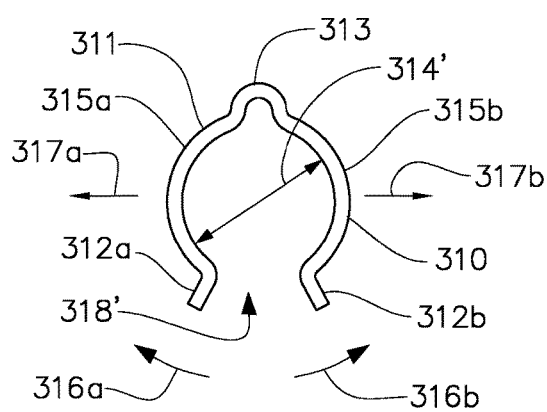
FIG. 9b is an orthogonal view of the spring of FIG. 9a wherein the spring is shown in a flexed and radially expanded state with a larger and expanded inside diameter.

As shown in FIGS. 9*a-b*, spring 310 is made from square-section wire of width 319 and includes: a loop 311 composed of circular arc portions 315*a* and 315*b* having a combined inside diameter 314 and an offset portion 313 that extends radially outwardly from the arc portions 315*a* and 315*b*; and radial tangs 312*a* and 312*b* at its two ends, with a circumferential gap 318 therebetween. As shown in FIG. 9*a*, the spring 310 is in its relaxed and non-flexed state and has a radially inwardly contracted orientation with an inside diameter 314 smaller than the major diameter 326 and may be generally equal to the root diameter 324 of the internal member 320. As shown in FIG. 9*b*, the tangs 312*a* and 312*b* have both been manipulated to be circumferentially spread apart in directions 316*a* and 316*b*, causing the offset portion 313 and arc portions 315*a* and 315*b* to be elastically flexed to achieve a a radially outwardly expanded state with an enlarged inside diameter 314' that is sized to have radial clearance with the major diameter 326 of the internal member 320. Since the offset portion 313 is radially outward of the arc portions 315*a* and 315*b*, and since the offset portion 313 is positioned in the most highly stressed region of the spring 310, the deflection of the offset portion 313 may be greater than that of the loop portion 311 such that the arc portions 315a and 315b may laterally spread in directions 317a and 317b respectively rather than a purely circumferential expansion.

Figure 9C:
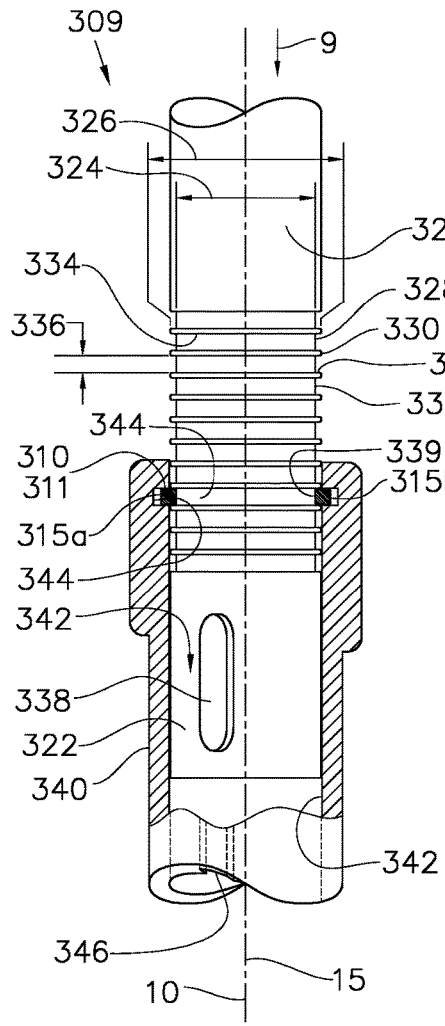
FIG. 9c is a partial cross section view of the embodiment of FIG. 9a, corresponding to the view and assembly sequence of FIG. 5a, showing the spring of FIG. 9a as assembled to an internal member and to an external member, with the spring relaxed to a locked orientation and to have a radially overlying engagement with a configured surface of the internal member, while also having a radially overlying engagement and with a groove of the external member, such that the internal member is axially engaged relative to the spring in a blocking engagement therebetween.

In contrast to the embodiment of FIGS. 8a-c, the external surface 322 of the internal member 310, as shown in FIG. 9c, has a non-smooth portion that includes a series of axially spaced circumferential grooves 328. These grooves 328 result in a corresponding series of axially spaced ridges 330 extending radially outwardly from the root diameter 324 of the groove to a major diameter 326. Each groove 328 has a generally cylindrical and square root surface 332 that is parallel to the axial axis 15 and is axially flanked by generally square flank surfaces 334 that extend radially to be generally perpendicular to the axial axis 15. The groove 328 is shown to have a generally square profile with an axial width 336 sized to provide clearance with the square wire width 319 of the spring 310. The grooves 328 and ridges 330 result in a configured contour of the external surface 322 that serves to interface with the spring 310. Internal member 320 also includes a key 338 similar to those described hereinabove.

FIG. 9c shows the complete seatpost assembly 309 that is shown to also include the external member 340, which includes: an axially extending opening 342 to receive the internal member 320, a circumferential groove 344 within the opening 342 to receive the spring 310; two circumferential slots (not shown, but similar to the slot 154 of FIGS. 5a-c described hereinabove, for example) that are positioned for through-passage of corresponding tangs 312a and 312b; and a keyway 346 to receive the key 338 in a circumferentially keyed engagement identical to that described in FIGS. 2a-j. Groove 344 has a generally square profile with flanks that extend generally radially outward and perpendicular to the axial axis 15. The spring 310 is fitted within groove 344 with tang 312a extending through the first circumferential slot and tang 312b extending through the second circumferential slot. The internal member 285 is positioned within the opening 342 and extending through the center of the loop 311 while the key 338 is engaged with keyway 346.

As shown in FIG. 9c, the spring 310 is in its relaxed state as shown in FIG. 9a, such that the inside diameter of the loop is nested within one of the grooves 328 to be radially overlapping and overlying the flanks 334 of the corresponding ridge 330 to provide a square blocking engagement interface 339. The spring 310 is also radially overlapping and overlying the flanks of the groove 344. Thus, the spring 310 is shown to be radially straddling both grooves 328 and 344 to serve as a key to engage the internal member 320 to the external member 340 and restrict axial movement therebetween. Since the flanks 334 are square and since the wire cross-section is square and oriented as shown, the engagement therebetween is considered a blocking engagement to support axial load 9. This blocking engagement serves to positively axially lock the internal member 320 at the selected seat height corresponding to the position shown in FIG. 9c and the spring 310 will not cam radially outward or become released. The seatpost assembly 309 is now considered to be in an axially locked orientation such that it may support axial load 9. This blocking engagement is in contrast to the camming engagement described in FIGS. 5a-c, where assuming an exceedingly high axial load 9, the spring 138 may potentially be cammed radially outwardly by the ramped ridge 135 such that the internal member 13 may axially slip relative to the external member 150.

Figure 9D:
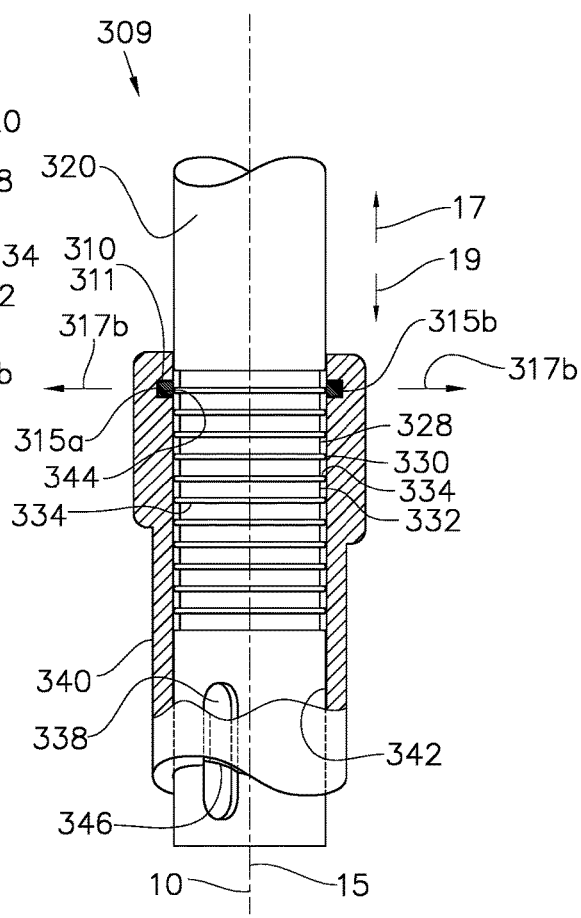
FIG. 9d is a partial cross section view of the embodiment of FIG. 9a, corresponding to the view and assembly sequence of FIG. 5b, showing the spring as manipulated to a released orientation shown in FIG. 9b, such that its radially overlying engagement with the internal member is released to permit the internal member to be axially displaced in the axially downward direction relative to the external member as shown.

Next, as shown in FIG. 9d, the tangs 312a and 312b have been manually manipulated to be circumferentially spread in respective directions 316a and 316b (as described in FIG. 9b) to elastically flex and expand the loop 311 to achieve an enlarged inside diameter 314' to provide radial clearance with the major diameter 326 of the ridges 330. The internal member 320 may now be axially displaced in directions 17 or 19 to correspondingly raise or lower the height of the seat (not shown). Once the desired seat height position is achieved, the tangs 312a and 312b may be released, allowing the spring 310 to return to its free state (as shown in FIGS. 9a and 9c) and to nest within a different groove 340 to axially lock the internal member 320 (and seat attached thereto) at this newly selected axial height position.

As shown in the embodiment of FIGS. 2a-j, the spring 50 is positioned to be generally axially fixed to the stationary element (i.e. the external member 7) and operative to have a gripping interface 95 with the displaceable element (i.e. the internal member 5). However, it is considered that the arrangement of FIGS. 2a-j may be transposed such that the spring is positioned to be generally axially fixed to the displaceable element and operative to have a gripping engagement with the axially fixed element and also transposed such that the spring is axially fixed to the internal member and axially displaceable relative to the external member. Such an alternate arrangement is described in FIG. 10, which describes a seatpost assembly 349 where the spring 360 is generally axially fixed to the axially displaceable internal member 350 and operative to have a gripping engagement 380 with the axially fixed external member 370.

The internal member 350 is a generally circular cylindrical element extending along the axial axis 15 and includes: an external surface 351; an axially extending opening 352; a circumferential relief 358 of diameter 359 to receive the coil 366 of the spring 360; abutment surfaces 357a and 357b to axially capture the coil 366 of the spring 360; a circumferential slot 354 extending radially therethrough that communicates between the relief 358 and the opening 352 to receive the lower tang 364; an axially extending groove 356 to receive the upper tang 362; and a key 355 to provide a circumferentially keyed engagement with the keyway 376 in a manner identical to the key 29 of FIGS. 2a-j. The spring 360 includes a coil 366 of outside diameter 368; a radially inwardly extending lower tang 364; and an axially upwardly extending upper tang 362. The external member 370 includes an axially extending opening 372 with a circular cylindrical internal surface 374 of inside diameter 375 to provide an axially guiding interface with the internal member 350; and a keyway 376 to interface with key 355 of the internal member 350 as described variously hereinabove.

Figure 10:
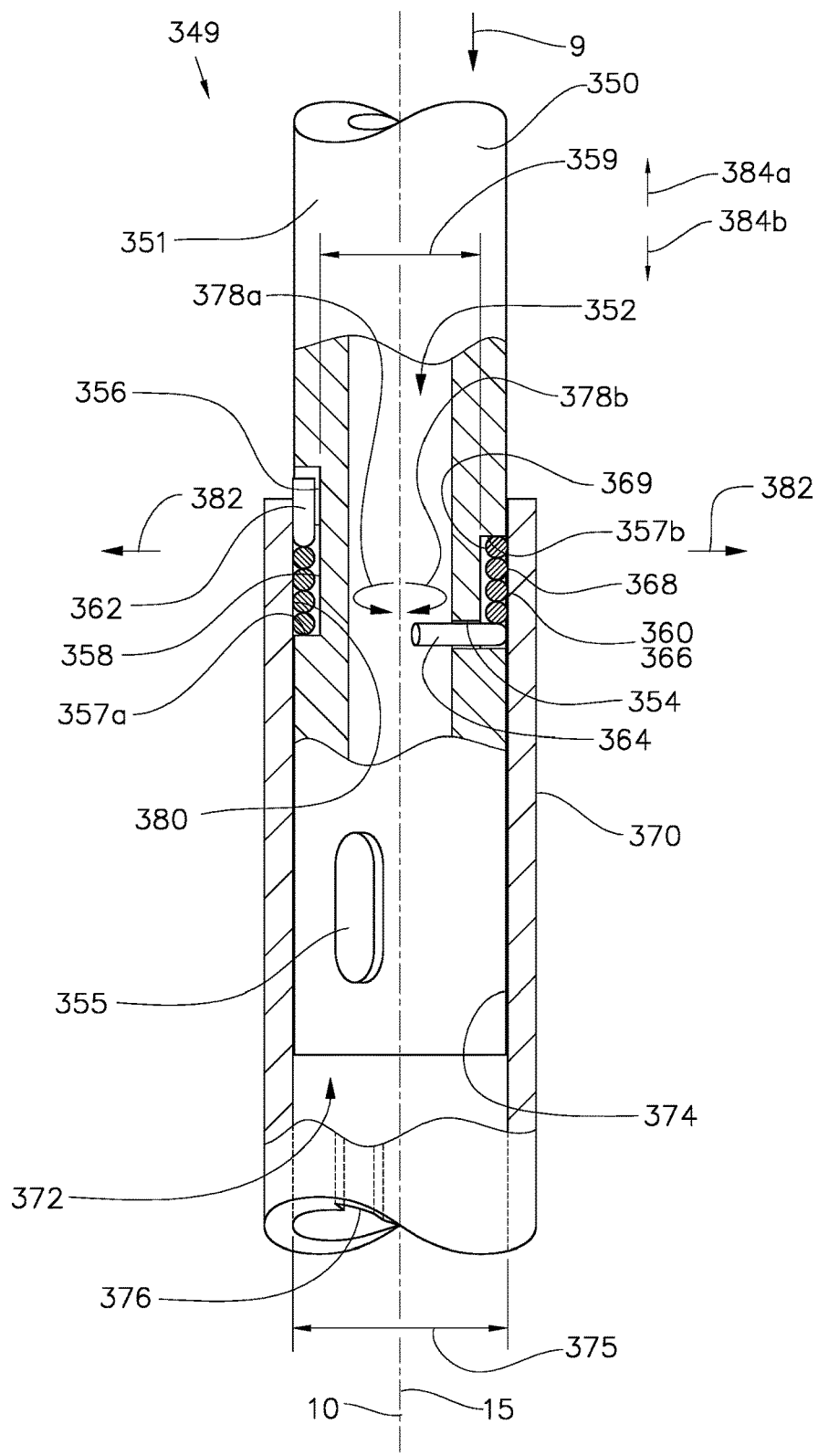
FIG. 10 is a cross-section view of an eighth embodiment of the present invention, corresponding to the view and assembly sequence of FIG. 5a, wherein the spring is axially retained to the internal member and has a gripping engagement with the internal diameter of the external member, wherein, in the released orientation of the spring, both the spring and internal member are axially displaceable relative to the external member.

As shown in FIG. 10, the spring 360 is mated to the internal member 350 such that the coil 366 is positioned within the relief 358, with the upper tang 362 nested and circumferentially keyed to the groove 356, and the lower tang 364 extending radially inwardly through the slot 354 to project into opening 352. The internal member 350 is positioned within the opening 372 in a telescopic engagement with the external member 370, with the external surface 351 radially piloted by the internal surface 374. The key 355 is circumferentially engaged to the keyway 376 to maintain circumferential alignment of the internal member 350 relative to the external member 370, while permitting axial displacement therebetween.

In its relaxed state, the outside diameter 368 of the coil 366 is slightly larger than the inside diameter 375 such that the spring 360 must flexed, by manually displacing the lower tang 364 in direction 378b to wind the coil 366 more tightly and to reduce its outside diameter 368 so that it may be inserted and assembled within the opening 372. When this manual displacement is released, the upper tang 362 will elastically return (in direction 378a) toward its relaxed state and the coil 366 will unwind such that its outside diameter 375 will expand radially outwardly in direction 382 against the internal surface 374. In its radially outwardly expanded orientation, the coil 366 now provides a radially outwardly gripping interface 380 with the internal surface 374 to bind, restrain, and restrict the axial displacement of the spring 360 relative to the external member 370. The portion of the internal surface 374 in contact with the spring 360 at the gripping interface 380 is considered the restraining surface. It is noted that the internal surface 374, in the restraining region that corresponds with the gripping interface 380, is a generally smooth surface. Since the coil 366 is axially captured within the relief 358 (between abutment surface 357a and 357b) in a maintained axial engagement therebetween as shown, this gripping interface 380 also serves to axially bind and/or lock the axial position of the internal member 350 with the external member 370 at the selected axial position therebetween. Since the seat (not shown) is fixed to the internal member 350 and the external member 370 is fixed to the frame (not shown), the seat height has also been locked at this selected axial position such that the internal member 350 (and the seat attached thereto) may support a normal level of axial load 9 without axial slippage.

If it is desired to raise or lower the seat height to a different axial position, the user need only elastically displace the lower tang 364 in direction 378b to more tightly wind and contract the coil 366. This serves to temporarily contract and reduce its outside diameter 368 and release the gripping engagement 380 such that the internal member 350 (and the seat fixed thereto) may be axially displaced to selectively achieve a new seat height. The inside diameter 369 is correspondingly reduced and diameter 359 is preferably sized such that, when the coil 366 is radially inwardly deflected, its inside diameter 369 will radially abut relief 358 to limit this radially inward deflection such that the coil cannot be stressed beyond its elastic limit and to keep the outside diameter 368 centered for free axial displacement of the internal member 350 in directions 384a and 384b.

While my above description contains many specificities, these should not be construed as limitations on the scope of the invention, but as merely providing exemplary illustrations of some of the preferred embodiments of this invention. For example:

The circumferentially keyed engagement of FIGS. 2a-j describes a radially outwardly projecting key 29 of the inner member 5 circumferentially engaged to a radially outwardly projecting and axially extending slot 31 of the outer member 7. This keyed engagement may alternatively be transposed such that the outer member includes a radially inwardly projecting key that is circumferentially engaged to a radially inwardly projecting and axially extending slot of the inner member.

The embodiment of FIGS. 2a-j describes the free and relaxed inside diameter 52 of the coil 65 (in its free and relaxed state) as being smaller than the outside diameter 47 of the inner member 5 such that the pre-stress and flex of the coil 65 serves to bias the coil toward a more tightly wrapped configuration and to provide a radially inward gripping force against the inner member 5 at the gripping interface 95. Alternatively, the free and relaxed inside diameter of the coil may be equal to or larger than the outside diameter 47 of the inner member 5 such that there is no pre-stress and flex of the coil. Instead, an external element, such as the compression spring 110 of FIGS. 3a-c, may be included and oriented to bias the coil toward a more tightly wrapped configuration and to provide a radially inward gripping force against the inner member 5 at the gripping interface 95.

The embodiment of FIGS. 2a-j describes a spring 50 where it's elasticity biases the coil 65 toward a gripping interface 95 with the internal member 7. This may be considered as a "normally locked" arrangement of the locking mechanism 13 since the spring 50, when released, will always passively seek a gripping interface 95 to lock or restrict axial displacement of the internal member 5 relative to the external member 7. The radial tang 60 must be actively manipulated in order to release the gripping interface 95 and its corresponding restriction of axial displacement of the inner member 5 relative the outer member 7. However, it is envisioned that the spring may alternatively be designed such that the free and relaxed inside diameter 52 of the coil 65 is slightly larger than the outside diameter 47 of the inner member 5. In this case, the elasticity of the spring, when released, will always passively seek toward the release of any such gripping interface 95 and the spring will need to be actively flexed to initiate and maintain the gripping interface 95. This may be considered as a "normally released" arrangement of the locking mechanism 13 since the spring 50, when released, will always passively seek to release the gripping interface 95.

The fixed member (for example, the external member 7 of FIGS. 2a-k) is shown as a separate element that is fixed to the frame (not shown). Alternatively, the fixed member may be contiguous and/or monolithic with the bicycle frame as a singular element. For example, as shown in FIGS. 2a-j, the seat tube of a bicycle frame may include all of the features of external member 7 such that the internal member 5, collar 33, spring 50, and pins 43 may be assembled directly to this seat tube.

The springs of FIGS. 2a-k, 4, 5a-c, 6a-n, 7a-e, 8a-c, and 9a-d are shown to be axially engaged and captured to their corresponding external member to limit axial displacement therebetween in both axial directions 17 and 19. However, in an alternative scenario, the spring may be axially captured and engaged to the external member or external element in only one axial direction and may be displaceable relative to the external member or external element in the opposite axial direction. For example, in FIGS. 2g-i, the transition face 96 may be eliminated such that the spring 50 is only supported by abutment face 78 to limit its displacement in the downward axial direction 19, while the spring 50 has unlimited displacement in the upward axial direction 17.

The embodiment shown in FIG. 1 shows the seat 3 as directly connected to the upper end of the displaceable internal member 5. However, it is understood that the seat may alternatively be indirectly connected to displaceable internal member 5. For example, the seat may be connected to an articulating linkage that is directly connected to the frame of a bicycle. In this case, the seatpost assembly 1 would be utilized to merely control the displacement of this articulating linkage, with the locking mechanism 13 used to lock the position at of the articulating linkage at a given displacement.

As shown in FIGS. 2a-j, for example, the tang 60 may be directly manually manipulated to control the locking mechanism 13. However, it may be desirable to have the locking mechanism be alternatively remotely controlled. For example, it may be preferable to control the locking mechanism at the handlebar (not shown) of a bicycle (not shown). In such a case, the seatpost assembly 1 may also include an actuation lever (not shown) connected to the handlebar, with a control cable extending from the actuation lever to the tang 60 such that manipulation of the actuation lever will serve to correspondingly manipulate the locking mechanism 13.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

The invention claimed is:

1. A seatpost assembly comprising:
a first seatpost portion;
a second seatpost portion that is axially displaceable relative to said first seatpost portion along an axial axis in a retracting direction of increasing axial overlap with said first seatpost portion to a retracted position and in an axially extending direction of decreasing axial overlap with said first seatpost portion to an extended position thereof;
an engagement element including a coil portion thereof positioned to extend generally circumferentially around at least one of said first seatpost portion and said second seatpost portion, said coil portion including a first engagement surface and a second engagement surface opposite said first engagement surface;
wherein said engagement element may be elastically deflected by moving said first engagement surface: (i) in a relaxing direction toward an engaged orientation that is functional to provide restraint of said axial displacement of said second seatpost portion relative to said first seatpost portion at a restraining interface with a restraining surface of one of said first seatpost portion or said second seatpost portion; and (ii) in a deflecting direction toward a released orientation that is functional to reduce said restraint of said axial displacement relative to said engaged orientation;
wherein said second engagement surface has an axially maintained engagement with the other one of said first seatpost portion or said second seatpost portion; and
wherein said released orientation corresponds to one of: (i) a radially outwardly expanded orientation of said engagement element relative to said engaged orientation; and (ii) a radially inwardly contracted orientation of said engagement element relative to said engaged orientation.

2. The seatpost assembly according to claim 1, wherein said engaged orientation serves to maintain the axial position of said first seatpost portion relative to said second seatpost portion and to support axial load therebetween along said axial axis.

3. The seatpost assembly of claim 1, wherein said seatpost assembly is a structural assembly that may support lateral loading.

4. The seatpost assembly according to claim 1, including a seating surface, wherein said seating surface is solely connected to said second seatpost portion.

5. The seatpost assembly according to claim 1, wherein one of said first seatpost portion and said second seatpost portion is an external element that includes an opening therein and the other of said first seatpost portion and said second seatpost portion is an internal element that is positioned within said opening; and wherein said axial displacement includes telescopic displacement between said internal element and said external element along said axial axis.

6. The seatpost assembly according to claim 5, wherein said internal element includes a structural hollow portion with at least one of a cavity and an opening therein.

7. The seatpost assembly of claim 1, wherein one of: (i) said radially inwardly contracted orientation corresponds to said engaged orientation and said radially outwardly expanded orientation corresponds to said released orientation, and wherein, in said expanded orientation, said engagement element radially abuts an abutment surface of said other one of said first seatpost portion or said second seatpost portion to limit the radially outward expansion of said engagement element; and (ii) said radially outwardly expanded orientation corresponds to said engaged orientation and said radially inwardly contracted orientation corresponds to said released orientation, and wherein, in said contracted orientation, said engagement element radially abuts an abutment surface of said other one of said first seatpost portion or said second seatpost portion to limit the radially inward contraction of said engagement element.

8. The seatpost assembly according to claim 1, wherein said axially maintained engagement includes a wedging interface with said engagement element, such that displacement of said second seatpost portion in said retracting direction serves to wedge said engagement element to increase said restraint.

9. The seatpost assembly according to claim 1, wherein said axially maintained engagement includes a radially overlapping blocking interface with said engagement element.

10. The seatpost assembly according to claim 1, wherein said engagement element is a helical coil element including a plurality of axially overlapping loops, wherein said axially maintained engagement serves to radially overlie and support a plurality of said loops to limit the axially downward displacement of said engagement element.

11. The seatpost assembly according to claim 1, wherein said restraining surface is in said first seatpost portion.

12. The seatpost assembly according to claim 1, wherein said restraining surface is in said second seatpost portion.

13. The seatpost assembly according to claim 1, wherein said restraining interface is a frictionally gripping interface.

14. The seatpost assembly of claim 13, wherein said restraining surface is an axially smooth surface.

15. The seatpost assembly according to claim 1, wherein said restraining surface includes a configured surface of radially variable geometry, and wherein said restraining interface includes a radially overlying engagement at said configured surface.

16. The seatpost assembly according to claim 15, wherein said coil portion is a helical coil of a helical pitch along said axial axis and said restraining surface includes a helical rib having a helical pitch along said axial axis that corresponds to said helical pitch of said coil portion such that said coil portion has a radially extending overlying engagement with said helical rib at said restraining interface.

17. The seatpost assembly according to claim 15, wherein said engagement element is pre-loaded to radially bias said engagement element to press against said restraining surface and to support said overlying engagement.

18. The seatpost assembly according to claim 15, wherein said restraining interface is a blocking interface, wherein said overlying engagement serves to positively lock the axial position of said first seatpost portion to said second seatpost portion.

19. The seatpost assembly according to claim 2, including a load limit of said axial load such that, in said engaged orientation, said restraining interface will support the axial position of said first seatpost portion relative to said second seatpost portion at axial loads up to said load limit, and said restraining interface may permit axial displacement of said first seatpost portion relative to said second seatpost portion at axial loads that exceeds said load limit.

20. The seatpost assembly according to claim 19, wherein said load limit is a predetermined load limit.

21. The seatpost assembly according to claim 1, wherein said restraining interface includes direct contact between said engagement element and said restraining surface at said restraining interface.

22. The seatpost assembly according to claim 1, wherein said restraining interface is a generally circular circumferential restraining interface.

23. The seatpost assembly according to claim 1, wherein said engagement element serves to circumferentially constrict said restraining surface at said restraining interface.

24. The seatpost assembly according to claim 1, including a laterally displaceable intermediate element, wherein said restraining interface is between said intermediate element and said restraining surface, and wherein said engagement element serves to laterally bias said intermediate element for selective manipulation of said restraining interface.

25. The seatpost assembly according to claim 1, including a plurality of said engagement elements having a plurality of corresponding restraining interfaces.

26. The seatpost assembly according to claim 1, wherein said coil portion is a helically overlapping coil portion including a plurality of individual loops arranged in a circumferentially overlapping helical configuration to include an upper loop of said coil portion and a lower loop of said coil portion that is axially below said upper loop.

27. The seatpost assembly according to claim 1, wherein said engaged orientation corresponds to a radially inwardly contracted orientation of said coil portion relative to said released orientation.

28. The seatpost assembly according to claim 1, wherein said engaged orientation corresponds to a radially outwardly expanded orientation of said coil portion relative to said released orientation.

29. The seatpost assembly according to claim 2, wherein said coil portion is a flat coil portion including a singular circumferential loop that extends circumferentially by a maximum of 360 degrees.

30. The seatpost assembly according to claim 26, wherein said helically overlapping coil portion includes between two and four individual loops.

31. The seatpost assembly according to claim 26, wherein said helically overlapping coil portion includes at least four individual loops.

32. The seatpost assembly according to claim 26, wherein the at least a portion of said upper loop is axially stacked on said lower loop in an axially stacked overlapping region.

33. The seatpost assembly according to claim 26, wherein the at least a portion of said coil portion is an axially gapped coil portion to include an axial gap between axially adjacent loop portions.

34. The seatpost assembly according to claim 26, wherein said first engagement surface is an axially raised upper engagement surface connected to said upper loop and said second engagement surface is connected to said lower loop, and wherein said first engagement surface is axially restrained while said lower engagement surface has freedom of axially downward displacement in a hanging coil configuration, and wherein the circumferential displacement of said second engagement surface is circumferentially engaged to limit the circumferential displacement of said second engagement surface.

35. The seatpost assembly according to claim 1, wherein the circumferential displacement of said second engagement surface is limited and wherein said first engagement surface may be circumferentially displaced relative to said second termination for selective control of said engagement element between said engaged orientation and said released orientation.

36. The seatpost assembly according to claim 1, wherein both of said first engagement surface and said second engagement surface may be simultaneously circumferentially displaced for selective control of said engagement element between said engaged orientation and said released orientation.

37. The seatpost assembly according to claim 26, wherein said axially maintained engagement is between said first seatpost portion and said engagement element, wherein said maintained engagement serves to limit the axially downward displacement of said lower loop, and wherein said second engagement surface is connected to said lower loop to limit the circumferential displacement of said lower termination relative to said first seatpost portion.

38. The seatpost assembly according to claim 1, including a circumferential engagement directly between said first seatpost portion and said second seatpost portion such that the circumferential position of said second seatpost portion is controlled relative to said first seatpost portion within the axial range of said axial displacement of said second seatpost portion.

39. The seatpost assembly according to claim 38, wherein said circumferential engagement is a radially overlying circumferentially keyed engagement.

40. The seatpost assembly of claim 1, including a biasing element operative to circumferentially bias said first engagement surface relative to said second engagement surface to bias said coil portion: (i) toward said radially outwardly expanded orientation or (ii) toward said radially inwardly contracted orientation.

* * * * *